United States Patent
Rongo et al.

(10) Patent No.: US 12,483,384 B1
(45) Date of Patent: Nov. 25, 2025

(54) RESYNCHRONIZING ENCRYPTED NETWORK TRAFFIC

(71) Applicant: ExtraHop Networks, Inc., Seattle, WA (US)

(72) Inventors: Eric James Rongo, Seattle, WA (US); Charlotte Ching-Hsing Tan, Seattle, WA (US); Benjamin Thomas Higgins, Shoreline, WA (US); Kevin Michael Seguin, Germantown, TN (US); Michael Kerber Krause Montague, Lake Forest Park, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 19/181,210

(22) Filed: Apr. 16, 2025

(51) Int. Cl.
H04L 9/06 (2006.01)

(52) U.S. Cl.
CPC ............ H04L 9/0637 (2013.01); H04L 9/065 (2013.01)

(58) Field of Classification Search
CPC .............................. H04L 9/0637; H04L 9/065
See application file for complete search history.

(56) References Cited

U.S. PATENT DOCUMENTS

| | | |
|---|---|---|
| 5,027,269 A | 6/1991 | Grant et al. |
| 5,430,727 A | 7/1995 | Callon et al. |
| 5,541,995 A | 7/1996 | Normile et al. |
| 5,548,646 A | 8/1996 | Aziz et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |

(Continued)

FOREIGN PATENT DOCUMENTS

| | | |
|---|---|---|
| AU | 2003287262 A1 | 5/2004 |
| AU | 2003287262 A8 | 5/2004 |

(Continued)

OTHER PUBLICATIONS

Office Communication for U.S. Appl. No. 15/585,887 mailed May 3, 2024, 45 Pages.

(Continued)

*Primary Examiner* — Abu S Sholeman
(74) *Attorney, Agent, or Firm* — John W. Branch; Branch Partners PLLC

(57) ABSTRACT

Embodiments resynchronize encrypted network traffic. A capture flow that includes network traffic captured from encrypted network flows may be monitored and the captured network traffic may be decrypted for analysis. A hole in the capture flow may be determined based on gaps in portions of the captured network traffic disabling the monitoring of the capture flow and the decryption of the captured network traffic. A size of the hole may be determined based on a size of the gap in the portions of the captured network traffic. Other network traffic may be captured from the capture flow subsequent to the hole. Cipher resynchronization parameters may be determined based on the size of the hole, other portions of the captured network traffic, or the encryption protocol. The other portions of the captured network traffic may be decrypted based on the cipher resynchronization parameters to reenable monitoring of the capture flow.

20 Claims, 13 Drawing Sheets

(56) References Cited

U.S. PATENT DOCUMENTS

| | | |
|---|---|---|
| 5,857,188 A | 1/1999 | Douglas |
| 5,867,661 A | 2/1999 | Bittinger et al. |
| 5,928,363 A | 7/1999 | Ruvolo |
| 6,040,834 A | 3/2000 | Jain et al. |
| 6,058,429 A | 5/2000 | Ames et al. |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | Digiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,597,777 B1 | 7/2003 | Ho |
| 6,636,838 B1 | 10/2003 | Perlman et al. |
| 6,704,311 B1 | 3/2004 | Chuah et al. |
| 6,704,874 B1 | 3/2004 | Porras et al. |
| 6,760,775 B1 | 7/2004 | Anerousis et al. |
| 6,765,909 B1 | 7/2004 | Sen et al. |
| 6,789,203 B1 | 9/2004 | Belissent |
| 6,789,206 B1 | 9/2004 | Wierzbicki et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen et al. |
| 7,047,303 B2 | 5/2006 | Lingafelt et al. |
| 7,089,326 B2 | 8/2006 | Boucher et al. |
| RE39,360 E | 10/2006 | Aziz et al. |
| 7,133,365 B2 | 11/2006 | Klinker et al. |
| 7,143,153 B1 | 11/2006 | Black et al. |
| 7,177,930 B1 | 2/2007 | Lopresti |
| 7,181,769 B1 | 2/2007 | Keanini et al. |
| 7,193,968 B1 | 3/2007 | Kapoor et al. |
| 7,222,366 B2 | 5/2007 | Bruton, III et al. |
| 7,313,141 B2 | 12/2007 | Kan et al. |
| 7,342,897 B1 | 3/2008 | Nader et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,561,517 B2 | 7/2009 | Klinker et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,619,988 B2 | 11/2009 | Shimada et al. |
| 7,620,986 B1 | 11/2009 | Jagannathan et al. |
| 7,636,305 B1 | 12/2009 | Taylor et al. |
| 7,639,613 B1 | 12/2009 | Ghannadian et al. |
| 7,644,150 B1 | 1/2010 | Nucci et al. |
| 7,660,883 B1 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,917,647 B2 | 3/2011 | Cooper et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,145,633 B1 | 3/2012 | Manolis et al. |
| 8,185,953 B2 | 5/2012 | Rothstein et al. |
| 8,194,542 B2 | 6/2012 | Vaeaenaenen et al. |
| 8,332,765 B2 | 12/2012 | Ergan et al. |
| 8,352,725 B1 | 1/2013 | O'toole, Jr. |
| 8,402,540 B2 | 3/2013 | Kapoor et al. |
| 8,411,677 B1 | 4/2013 | Colloff |
| 8,418,249 B1 | 4/2013 | Nucci et al. |
| 8,443,190 B2 | 5/2013 | Breton et al. |
| 8,457,127 B2 | 6/2013 | Eastham et al. |
| 8,494,985 B1 | 7/2013 | Keralapura et al. |
| 8,504,456 B2 | 8/2013 | Griffin et al. |
| 8,533,254 B1 | 9/2013 | Whitson, Jr. et al. |
| 8,555,383 B1 | 10/2013 | Marshall et al. |
| 8,561,177 B1 | 10/2013 | Aziz et al. |
| 8,577,817 B1 | 11/2013 | Keralapura et al. |
| 8,578,024 B1 | 11/2013 | Keralapura et al. |
| 8,601,531 B1 | 12/2013 | Zolfonoon et al. |
| 8,613,089 B1 | 12/2013 | Holloway et al. |
| 8,619,579 B1 | 12/2013 | Rothstein et al. |
| 8,621,615 B2 | 12/2013 | Zhao |
| 8,626,912 B1 | 1/2014 | Rothstein et al. |
| 8,627,422 B2 | 1/2014 | Hawkes et al. |
| 8,635,441 B2 | 1/2014 | Frenkel et al. |
| 8,667,151 B2 | 3/2014 | Mizikovsky et al. |
| 8,699,357 B2 | 4/2014 | Deshpande et al. |
| 8,707,440 B2 | 4/2014 | Gula et al. |
| 8,744,894 B2 | 6/2014 | Christiansen et al. |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,867,343 B2 | 10/2014 | Rothstein et al. |
| 8,959,643 B1 | 2/2015 | Invernizzi et al. |
| 8,964,548 B1 | 2/2015 | Keralapura et al. |
| 8,971,196 B2 | 3/2015 | Degioanni et al. |
| 9,003,065 B2 | 4/2015 | Rothstein et al. |
| 9,026,467 B2 | 5/2015 | Bammi et al. |
| 9,036,493 B2 | 5/2015 | Degioanni et al. |
| 9,038,178 B1 | 5/2015 | Lin |
| 9,049,216 B2 | 6/2015 | Mccanne et al. |
| 9,054,952 B2 | 6/2015 | Rothstein et al. |
| 9,083,740 B1 | 7/2015 | Ma et al. |
| 9,094,288 B1 | 7/2015 | Nucci et al. |
| 9,094,326 B2 | 7/2015 | Sundararajan et al. |
| 9,152,808 B1 | 10/2015 | Ramalingam et al. |
| 9,158,604 B1 | 10/2015 | Christodorescu et al. |
| 9,166,994 B2 | 10/2015 | Ward et al. |
| 9,176,838 B2 | 11/2015 | Li et al. |
| 9,183,573 B2 | 11/2015 | Tseng |
| 9,189,318 B2 | 11/2015 | Li et al. |
| 9,191,288 B2 | 11/2015 | Rothstein et al. |
| 9,191,400 B1 | 11/2015 | Ptasinski et al. |
| 9,203,865 B2 | 12/2015 | Linden et al. |
| 9,210,135 B2 | 12/2015 | Rothstein et al. |
| 9,264,288 B1 | 2/2016 | Arora et al. |
| 9,300,554 B1 | 3/2016 | Kosai et al. |
| 9,323,426 B2 | 4/2016 | Yang |
| 9,338,147 B1 | 5/2016 | Rothstein et al. |
| 9,357,410 B2 | 5/2016 | Nedeltchev et al. |
| 9,367,687 B2 | 6/2016 | Warshenbrot |
| 9,369,479 B2 | 6/2016 | Lin |
| 9,378,361 B1 | 6/2016 | Yen et al. |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 | 7/2016 | Guo et al. |
| 9,426,036 B1 | 8/2016 | Roy |

(56) References Cited

U.S. PATENT DOCUMENTS

| | | |
|---|---|---|
| 9,430,646 B1 | 8/2016 | Mushtaq et al. |
| 9,432,430 B1 | 8/2016 | Klenz |
| 9,460,299 B2 | 10/2016 | Weiss et al. |
| 9,461,875 B2 | 10/2016 | Groat et al. |
| 9,479,405 B1 | 10/2016 | Tongaonkar et al. |
| 9,483,742 B1 | 11/2016 | Ahmed |
| 9,516,053 B1 | 12/2016 | Muddu et al. |
| 9,531,736 B1 | 12/2016 | Torres et al. |
| 9,565,202 B1 | 2/2017 | Kindlund et al. |
| 9,565,203 B2 | 2/2017 | Bernstein et al. |
| 9,584,381 B1 | 2/2017 | Leone |
| 9,591,015 B1 | 3/2017 | Amin et al. |
| 9,621,443 B2 | 4/2017 | Kosai et al. |
| 9,621,523 B2 | 4/2017 | Rothstein et al. |
| 9,654,485 B1 | 5/2017 | Neumann |
| 9,654,503 B1 | 5/2017 | Kowalyshyn |
| 9,660,879 B1 | 5/2017 | Rothstein et al. |
| 9,692,658 B2 | 6/2017 | Guo et al. |
| 9,705,895 B1 | 7/2017 | Gutzmann |
| 9,715,820 B1 | 7/2017 | Boss et al. |
| 9,729,416 B1 | 8/2017 | Khanal et al. |
| 9,756,061 B1 | 9/2017 | Roeh et al. |
| 9,813,311 B1 | 11/2017 | Leone |
| 9,860,209 B2 | 1/2018 | Buchanan et al. |
| 9,876,810 B2 | 1/2018 | Mcdougal et al. |
| 9,888,021 B2 | 2/2018 | Horesh et al. |
| 9,893,897 B2 | 2/2018 | Li et al. |
| 9,967,292 B1 | 5/2018 | Higgins et al. |
| 10,009,364 B2 | 6/2018 | Dasgupta et al. |
| 10,009,793 B2 | 6/2018 | Wetterwald et al. |
| 10,027,689 B1 | 7/2018 | Rathor et al. |
| 10,028,167 B2 | 7/2018 | Calin et al. |
| 10,033,766 B2 | 7/2018 | Gupta et al. |
| 10,037,546 B1 | 7/2018 | Benisch et al. |
| 10,038,611 B1 | 7/2018 | Wu et al. |
| 10,050,982 B1 | 8/2018 | Guerra et al. |
| 10,063,434 B1 | 8/2018 | Khanal et al. |
| 10,116,679 B1 | 10/2018 | Wu et al. |
| 10,122,748 B1 | 11/2018 | Currie |
| 10,176,323 B2 | 1/2019 | Zhang et al. |
| 10,198,667 B2 | 2/2019 | Ryan, Jr. et al. |
| 10,204,211 B2 | 2/2019 | Hammerle et al. |
| 10,237,294 B1 | 3/2019 | Zadeh et al. |
| 10,243,978 B2 | 3/2019 | Roeh et al. |
| 10,263,863 B2 | 4/2019 | Mukerji et al. |
| 10,263,883 B2 | 4/2019 | Kamble |
| 10,264,003 B1 | 4/2019 | Wu et al. |
| 10,270,794 B1 | 4/2019 | Mukerji et al. |
| 10,277,618 B1 | 4/2019 | Wu et al. |
| 10,291,637 B1 | 5/2019 | Bardenstein |
| 10,305,928 B2 | 5/2019 | Mcgrew et al. |
| 10,320,749 B2 | 6/2019 | Sengupta et al. |
| 10,321,344 B2 | 6/2019 | Barton et al. |
| 10,326,676 B2 | 6/2019 | Driggs et al. |
| 10,326,741 B2 | 6/2019 | Rothstein et al. |
| 10,332,005 B1 | 6/2019 | Liao et al. |
| 10,341,206 B1 | 7/2019 | Hammerle et al. |
| 10,348,767 B1 | 7/2019 | Lee et al. |
| 10,375,155 B1 | 8/2019 | Cai et al. |
| 10,380,498 B1 | 8/2019 | Chaoji et al. |
| 10,382,296 B2 | 8/2019 | Khanal et al. |
| 10,382,303 B2 | 8/2019 | Khanal et al. |
| 10,382,401 B1 | 8/2019 | Lee et al. |
| 10,389,574 B1 | 8/2019 | Wu et al. |
| 10,389,611 B2 | 8/2019 | Szabo et al. |
| 10,411,978 B1 | 9/2019 | Ball et al. |
| 10,411,982 B1 | 9/2019 | Driggs et al. |
| 10,412,080 B1 | 9/2019 | Edwards et al. |
| 10,419,454 B2 | 9/2019 | El-Moussa et al. |
| 10,476,673 B2 | 11/2019 | Higgins et al. |
| 10,484,334 B1 | 11/2019 | Lee et al. |
| 10,511,499 B2 | 12/2019 | Mukerji et al. |
| 10,536,268 B2 | 1/2020 | Anderson et al. |
| 10,536,475 B1 | 1/2020 | Mccorkle, Jr. et al. |
| 10,554,665 B1 | 2/2020 | Badawy et al. |
| 10,581,915 B2 | 3/2020 | Scherman et al. |
| 10,587,638 B2 | 3/2020 | Mukerji et al. |
| 10,594,664 B2 | 3/2020 | Zaifman et al. |
| 10,594,709 B2 | 3/2020 | Wu et al. |
| 10,594,718 B1 | 3/2020 | Deaguero et al. |
| 10,616,084 B2 | 4/2020 | Hammerle et al. |
| 10,673,870 B2 | 6/2020 | Pierce |
| 10,728,126 B2 | 7/2020 | Wu et al. |
| 10,742,530 B1 | 8/2020 | Wu et al. |
| 10,742,677 B1 | 8/2020 | Wu et al. |
| 10,778,700 B2 | 9/2020 | Azvine et al. |
| 10,783,262 B2 | 9/2020 | Goyal et al. |
| 10,805,338 B2 | 10/2020 | Kohout et al. |
| 10,841,194 B2 | 11/2020 | Kim et al. |
| 10,944,769 B2 | 3/2021 | Singh |
| 10,965,546 B2 | 3/2021 | Pignataro et al. |
| 10,965,702 B2 | 3/2021 | Higgins et al. |
| 10,979,282 B2 | 4/2021 | Wu et al. |
| 10,979,446 B1 | 4/2021 | Stevens et al. |
| 10,984,122 B2 | 4/2021 | Thomas |
| 10,992,693 B2 | 4/2021 | Luo et al. |
| 11,012,329 B2 | 5/2021 | Ball et al. |
| 11,055,300 B2 | 7/2021 | Zhang et al. |
| 11,057,420 B2 | 7/2021 | Mcgrew et al. |
| 11,093,518 B1 | 8/2021 | Lu et al. |
| 11,106,442 B1 | 8/2021 | Hsiao et al. |
| 11,157,446 B1 | 10/2021 | Kuruvada et al. |
| 11,159,549 B2 | 10/2021 | El-Moussa et al. |
| 11,165,814 B2 | 11/2021 | Lee et al. |
| 11,165,823 B2 | 11/2021 | Wu et al. |
| 11,165,831 B2 | 11/2021 | Higgins et al. |
| 11,188,550 B2 | 11/2021 | Haggie et al. |
| 11,194,901 B2 | 12/2021 | El-Moussa et al. |
| 11,200,246 B2 | 12/2021 | Kharisma et al. |
| 11,201,876 B2 | 12/2021 | Kallos et al. |
| 11,296,967 B1 | 4/2022 | Rothstein et al. |
| 11,310,256 B2 | 4/2022 | Higgins et al. |
| 11,323,467 B2 | 5/2022 | Deaguero et al. |
| 11,349,861 B1 | 5/2022 | Costlow et al. |
| 11,388,072 B2 | 7/2022 | Wu et al. |
| 11,431,744 B2 | 8/2022 | Mukerji et al. |
| 11,438,247 B2 | 9/2022 | Wu et al. |
| 11,463,299 B2 | 10/2022 | Wu et al. |
| 11,463,465 B2 | 10/2022 | Wu et al. |
| 11,463,466 B2 | 10/2022 | Higgins et al. |
| 11,496,378 B2 | 11/2022 | Ball et al. |
| 11,546,153 B2 | 1/2023 | Higgins et al. |
| 11,558,413 B2 | 1/2023 | Higgins et al. |
| 11,652,714 B2 | 5/2023 | Wu et al. |
| 11,665,207 B2 | 5/2023 | Higgins et al. |
| 11,706,233 B2 | 7/2023 | Higgins et al. |
| 11,843,606 B2 | 12/2023 | Wu et al. |
| 11,916,771 B2 | 2/2024 | Rothstein et al. |
| 12,107,888 B2 | 10/2024 | Wu et al. |
| 12,225,030 B2 | 2/2025 | Costlow et al. |
| 2001/0054157 A1 | 12/2001 | Fukumoto |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0059517 A1* | 5/2002 | Haviv ............... H04L 63/0227 713/154 |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0175934 A1 | 11/2002 | Hand et al. |
| 2002/0178360 A1 | 11/2002 | Wenocur et al. |
| 2002/0184362 A1 | 12/2002 | Banerjee et al. |
| 2002/0194483 A1 | 12/2002 | Wenocur et al. |
| 2002/0194501 A1 | 12/2002 | Wenocur et al. |
| 2002/0199096 A1 | 12/2002 | Wenocur et al. |
| 2002/0199098 A1 | 12/2002 | Davis |

(56) References Cited

U.S. PATENT DOCUMENTS

| | | |
|---|---|---|
| 2003/0014628 A1 | 1/2003 | Freed et al. |
| 2003/0018891 A1 | 1/2003 | Hall et al. |
| 2003/0023733 A1 | 1/2003 | Lingafelt et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0133443 A1 | 7/2003 | Klinker et al. |
| 2003/0135667 A1 | 7/2003 | Mann et al. |
| 2003/0145225 A1 | 7/2003 | Bruton, III et al. |
| 2003/0149887 A1 | 8/2003 | Yadav |
| 2003/0152094 A1 | 8/2003 | Colavito et al. |
| 2003/0156715 A1 | 8/2003 | Reeds et al. |
| 2003/0188189 A1 | 10/2003 | Desai et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0010714 A1 | 1/2004 | Stewart |
| 2004/0010718 A1 | 1/2004 | Porras et al. |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0044406 A1 | 2/2005 | Stute |
| 2005/0050316 A1 | 3/2005 | Peles |
| 2005/0055578 A1 | 3/2005 | Wright et al. |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0111367 A1 | 5/2005 | Jonathan Chao et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0207413 A1 | 9/2005 | Lerner |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2005/0270975 A1 | 12/2005 | Meylan et al. |
| 2005/0271072 A1 | 12/2005 | Anderson et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085379 A1 | 4/2006 | Heidloff et al. |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0114832 A1 | 6/2006 | Hamilton et al. |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2006/0248407 A1 | 11/2006 | Adams, Jr. et al. |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2007/0271592 A1 | 11/2007 | Noda et al. |
| 2008/0019275 A1 | 1/2008 | Mudireddy et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1 | 6/2008 | Deshpande et al. |
| 2008/0130659 A1 | 6/2008 | Polland |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0162390 A1 | 7/2008 | Kapoor et al. |
| 2008/0172416 A1 | 7/2008 | Ito |
| 2008/0174343 A1 | 7/2008 | Cha et al. |
| 2008/0209045 A1 | 8/2008 | Rothstein et al. |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0225740 A1 | 9/2008 | Martin et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0141634 A1 | 6/2009 | Rothstein et al. |
| 2009/0168657 A1 | 7/2009 | Puri et al. |
| 2009/0187653 A1 | 7/2009 | Fu et al. |
| 2009/0204723 A1 | 8/2009 | Tonsing et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0265344 A1 | 10/2009 | Etoh et al. |
| 2009/0268605 A1 | 10/2009 | Campbell et al. |
| 2009/0271469 A1 | 10/2009 | Benco et al. |
| 2009/0271511 A1 | 10/2009 | Peracha |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |
| 2009/0320138 A1 | 12/2009 | Keanini et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0088670 A1 | 4/2010 | Paster |
| 2010/0091770 A1 | 4/2010 | Ishikawa |

(56) References Cited

U.S. PATENT DOCUMENTS

| | | |
|---|---|---|
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0235481 A1 | 9/2010 | Deutsch et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0073490 A1 | 3/2011 | Hayamizu et al. |
| 2011/0098973 A1 | 4/2011 | Seidman |
| 2011/0122792 A1 | 5/2011 | Duffield et al. |
| 2011/0126259 A1 | 5/2011 | Krishnamurthi et al. |
| 2011/0126275 A1 | 5/2011 | Anderson et al. |
| 2011/0141913 A1 | 6/2011 | Clemens et al. |
| 2011/0150220 A1 | 6/2011 | Breton et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0231935 A1 | 9/2011 | Gula et al. |
| 2011/0280149 A1 | 11/2011 | Okada et al. |
| 2011/0296002 A1 | 12/2011 | Caram |
| 2011/0320394 A1 | 12/2011 | Mckeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Toensing et al. |
| 2012/0159267 A1 | 6/2012 | Gyorffy |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233311 A1 | 9/2012 | Parker et al. |
| 2012/0233694 A1 | 9/2012 | Baliga et al. |
| 2012/0243533 A1 | 9/2012 | Leong |
| 2012/0266209 A1 | 10/2012 | Gooding et al. |
| 2012/0278477 A1 | 11/2012 | Terrell et al. |
| 2012/0278625 A1 | 11/2012 | Narayanan et al. |
| 2012/0278890 A1 | 11/2012 | Maeaettae et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010600 A1 | 1/2013 | Jocha et al. |
| 2013/0010608 A1 | 1/2013 | Ramachandran et al. |
| 2013/0041896 A1 | 2/2013 | Ghani et al. |
| 2013/0042323 A1 | 2/2013 | Narayanaswamy et al. |
| 2013/0054758 A1 | 2/2013 | Imes et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0111543 A1 | 5/2013 | Brown et al. |
| 2013/0133032 A1 | 5/2013 | Li et al. |
| 2013/0136011 A1 | 5/2013 | Tardo et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1 | 8/2013 | Bhaskaran et al. |
| 2013/0212297 A1 | 8/2013 | Varga |
| 2013/0227259 A1 | 8/2013 | Kim |
| 2013/0227689 A1 | 8/2013 | Pietrowicz et al. |
| 2013/0232104 A1 | 9/2013 | Goyal et al. |
| 2013/0262655 A1 | 10/2013 | Deschenes et al. |
| 2013/0283373 A1 | 10/2013 | Zisapel et al. |
| 2013/0291107 A1 | 10/2013 | Marck et al. |
| 2013/0305357 A1 | 11/2013 | Ayyagari et al. |
| 2013/0305392 A1 | 11/2013 | Bar-el et al. |
| 2013/0315260 A1 | 11/2013 | Adiraju et al. |
| 2013/0339514 A1 | 12/2013 | Crank et al. |
| 2013/0347018 A1 | 12/2013 | Limp et al. |
| 2014/0007222 A1 | 1/2014 | Qureshi et al. |
| 2014/0013434 A1 | 1/2014 | Ranum et al. |
| 2014/0020067 A1 | 1/2014 | Kim et al. |
| 2014/0026193 A1 | 1/2014 | Saxman et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0177497 A1 | 6/2014 | Backholm et al. |
| 2014/0181248 A1 | 6/2014 | Deutsch et al. |
| 2014/0189093 A1 | 7/2014 | Du Toit et al. |
| 2014/0195666 A1 | 7/2014 | Dumitriu et al. |
| 2014/0195797 A1 | 7/2014 | Du Toit |
| 2014/0201838 A1 | 7/2014 | Varsanyi et al. |
| 2014/0214800 A1* | 7/2014 | Liang ............... G06F 16/24532 707/718 |
| 2014/0222998 A1 | 8/2014 | Vasseur et al. |
| 2014/0223325 A1 | 8/2014 | Melendez et al. |
| 2014/0241164 A1 | 8/2014 | Cociglio et al. |
| 2014/0242972 A1 | 8/2014 | Slotznick |
| 2014/0244851 A1 | 8/2014 | Lee |
| 2014/0245423 A1 | 8/2014 | Lee |
| 2014/0258511 A1 | 9/2014 | Sima et al. |
| 2014/0269276 A1 | 9/2014 | Rothstein et al. |
| 2014/0269777 A1* | 9/2014 | Rothstein ............ H04L 63/0428 370/503 |
| 2014/0280907 A1 | 9/2014 | Rothstein et al. |
| 2014/0280908 A1 | 9/2014 | Rothstein et al. |
| 2014/0304211 A1 | 10/2014 | Horvitz |
| 2014/0304339 A1 | 10/2014 | Hamilton |
| 2014/0310392 A1 | 10/2014 | Ho |
| 2014/0317288 A1 | 10/2014 | Krueger et al. |
| 2014/0337500 A1 | 11/2014 | Lee |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0007316 A1 | 1/2015 | Ben-shalom et al. |
| 2015/0019867 A1 | 1/2015 | Rothstein et al. |
| 2015/0019991 A1 | 1/2015 | Kristjánsson |
| 2015/0023168 A1 | 1/2015 | Kotecha et al. |
| 2015/0026027 A1 | 1/2015 | Priess et al. |
| 2015/0036501 A1 | 2/2015 | Rothstein et al. |
| 2015/0039749 A1 | 2/2015 | Kwan et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0097683 A1 | 4/2015 | Sloo et al. |
| 2015/0100780 A1 | 4/2015 | Rubin et al. |
| 2015/0106616 A1 | 4/2015 | Nix |
| 2015/0106930 A1 | 4/2015 | Honda et al. |
| 2015/0113588 A1 | 4/2015 | Wing et al. |
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |

(56) References Cited

U.S. PATENT DOCUMENTS

| | | |
|---|---|---|
| 2015/0188702 A1 | 7/2015 | Men et al. |
| 2015/0199229 A1 | 7/2015 | Amendjian et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0254439 A1 | 9/2015 | Ao et al. |
| 2015/0269358 A1 | 9/2015 | Hesketh et al. |
| 2015/0277802 A1 | 10/2015 | Oikarinen et al. |
| 2015/0304350 A1 | 10/2015 | Lin et al. |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0007314 A1 | 1/2016 | Rezvani et al. |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0105471 A1 | 4/2016 | Nunes et al. |
| 2016/0112475 A1 | 4/2016 | Lawson et al. |
| 2016/0112521 A1 | 4/2016 | Lawson et al. |
| 2016/0119215 A1 | 4/2016 | Deschenes et al. |
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0147583 A1 | 5/2016 | Ben et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0226913 A1 | 8/2016 | Sood et al. |
| 2016/0241574 A1 | 8/2016 | Kumar et al. |
| 2016/0255115 A1 | 9/2016 | Mital et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0315916 A1 | 10/2016 | Rothstein et al. |
| 2016/0337312 A1 | 11/2016 | Buchanan et al. |
| 2016/0352761 A1 | 12/2016 | Mcgrew et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0366020 A1 | 12/2016 | Ramachandran et al. |
| 2016/0366186 A1 | 12/2016 | Kamble |
| 2016/0373414 A1 | 12/2016 | Maccarthaigh |
| 2016/0380851 A1 | 12/2016 | Kosai et al. |
| 2016/0380885 A1 | 12/2016 | Jani et al. |
| 2017/0012836 A1 | 1/2017 | Tongaonkar et al. |
| 2017/0041296 A1 | 2/2017 | Ford et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085445 A1 | 3/2017 | Layman et al. |
| 2017/0085459 A1 | 3/2017 | Xia et al. |
| 2017/0085590 A1 | 3/2017 | Hsu et al. |
| 2017/0090906 A1 | 3/2017 | Reynolds |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0201810 A1 | 7/2017 | Anderson et al. |
| 2017/0220739 A1 | 8/2017 | Hammerle et al. |
| 2017/0228253 A1 | 8/2017 | Layman et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1 | 10/2017 | Mandyam |
| 2017/0289847 A1 | 10/2017 | Wetterwald et al. |
| 2017/0310703 A1 | 10/2017 | Ackerman et al. |
| 2017/0317941 A1 | 11/2017 | Eggleston et al. |
| 2017/0324758 A1 | 11/2017 | Hart et al. |
| 2017/0353437 A1 | 12/2017 | Ayyadevara et al. |
| 2017/0353477 A1 | 12/2017 | Faigon et al. |
| 2017/0364794 A1 | 12/2017 | Mahkonen et al. |
| 2017/0366526 A1 | 12/2017 | Wood et al. |
| 2018/0004972 A1 | 1/2018 | Ruggiero et al. |
| 2018/0007087 A1 | 1/2018 | Grady et al. |
| 2018/0013650 A1 | 1/2018 | Khanal et al. |
| 2018/0033089 A1 | 2/2018 | Goldman et al. |
| 2018/0034783 A1 | 2/2018 | Rothstein et al. |
| 2018/0075240 A1 | 3/2018 | Chen |
| 2018/0077189 A1 | 3/2018 | Doppke et al. |
| 2018/0084011 A1 | 3/2018 | Joseph et al. |
| 2018/0089286 A1 | 3/2018 | Marquardt et al. |
| 2018/0091391 A1 | 3/2018 | Turow et al. |
| 2018/0091413 A1 | 3/2018 | Richards et al. |
| 2018/0091534 A1 | 3/2018 | Dubrovsky et al. |
| 2018/0103056 A1 | 4/2018 | Kohout et al. |
| 2018/0109507 A1 | 4/2018 | Caldera et al. |
| 2018/0109557 A1 | 4/2018 | Yoo et al. |
| 2018/0115566 A1 | 4/2018 | Azvine et al. |
| 2018/0124078 A1 | 5/2018 | Hajmasan et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0145995 A1 | 5/2018 | Roeh et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0278419 A1 | 9/2018 | Higgins et al. |
| 2018/0324061 A1 | 11/2018 | Khanal et al. |
| 2018/0351781 A1 | 12/2018 | Movsisyan et al. |
| 2018/0351970 A1 | 12/2018 | Majumder et al. |
| 2018/0375882 A1 | 12/2018 | Kallos et al. |
| 2018/0375893 A1 | 12/2018 | Jordan et al. |
| 2019/0005205 A1 | 1/2019 | Dargar et al. |
| 2019/0007283 A1 | 1/2019 | Kieviet et al. |
| 2019/0012441 A1 | 1/2019 | Tuli et al. |
| 2019/0020669 A1 | 1/2019 | Glatfelter et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1 | 2/2019 | Khanal et al. |
| 2019/0079979 A1 | 3/2019 | Chan |
| 2019/0095478 A1 | 3/2019 | Tankersley et al. |
| 2019/0102469 A1 | 4/2019 | Makovsky et al. |
| 2019/0121979 A1 | 4/2019 | Chari et al. |
| 2019/0124123 A1 | 4/2019 | Higgins et al. |
| 2019/0132358 A1 | 5/2019 | Divalentin et al. |
| 2019/0132359 A1 | 5/2019 | Kraenzel et al. |
| 2019/0163678 A1 | 5/2019 | Bath et al. |
| 2019/0171725 A1 | 6/2019 | Shen et al. |

(56) References Cited

U.S. PATENT DOCUMENTS

| | | |
|---|---|---|
| 2019/0196912 A1 | 6/2019 | Didehban et al. |
| 2019/0199609 A1 | 6/2019 | Hammerle et al. |
| 2019/0230095 A1 | 7/2019 | Mcgrew et al. |
| 2019/0230124 A1 | 7/2019 | Hodgman et al. |
| 2019/0236149 A1 | 8/2019 | Kuruvada et al. |
| 2019/0245734 A1 | 8/2019 | Wu et al. |
| 2019/0245759 A1 | 8/2019 | Mukerji et al. |
| 2019/0245763 A1 | 8/2019 | Wu et al. |
| 2019/0245873 A1 | 8/2019 | Wu et al. |
| 2019/0253445 A1 | 8/2019 | Mukerji et al. |
| 2019/0260764 A1 | 8/2019 | Humphrey et al. |
| 2019/0266999 A1 | 8/2019 | Chandrasekaran et al. |
| 2019/0303198 A1 | 10/2019 | Kim et al. |
| 2019/0318109 A1 | 10/2019 | Thomas |
| 2019/0327156 A1 | 10/2019 | Hammerle et al. |
| 2019/0340554 A1 | 11/2019 | Dotan-cohen et al. |
| 2019/0372827 A1 | 12/2019 | Vasseur et al. |
| 2019/0372828 A1 | 12/2019 | Wu et al. |
| 2019/0372864 A1 | 12/2019 | Pignataro et al. |
| 2019/0387005 A1 | 12/2019 | Zawoad et al. |
| 2020/0034528 A1 | 1/2020 | Yang et al. |
| 2020/0052985 A1 | 2/2020 | Ball et al. |
| 2020/0067952 A1 | 2/2020 | Deaguero et al. |
| 2020/0076597 A1 | 3/2020 | Higgins et al. |
| 2020/0082081 A1 | 3/2020 | Sarin et al. |
| 2020/0099703 A1 | 3/2020 | Singh |
| 2020/0167349 A1 | 5/2020 | Marquardt et al. |
| 2020/0201850 A1 | 6/2020 | Haggie et al. |
| 2020/0220849 A1 | 7/2020 | Zaifman et al. |
| 2020/0236131 A1 | 7/2020 | Vejman et al. |
| 2020/0287879 A1* | 9/2020 | Chandoor ............ H04L 63/0807 |
| 2020/0287885 A1 | 9/2020 | Rodniansky |
| 2020/0287927 A1 | 9/2020 | Zadeh et al. |
| 2020/0321087 A1 | 10/2020 | Willis et al. |
| 2020/0366691 A1 | 11/2020 | Pierce |
| 2020/0382529 A1 | 12/2020 | Higgins et al. |
| 2020/0389469 A1 | 12/2020 | Litichever et al. |
| 2021/0006589 A1 | 1/2021 | Kohout et al. |
| 2021/0012020 A1 | 1/2021 | Malton et al. |
| 2021/0037033 A1 | 2/2021 | Mukerji et al. |
| 2021/0037043 A1 | 2/2021 | Lee et al. |
| 2021/0044608 A1 | 2/2021 | Deaguero et al. |
| 2021/0160283 A1 | 5/2021 | St. Pierre |
| 2021/0185087 A1 | 6/2021 | Wu et al. |
| 2021/0194781 A1 | 6/2021 | Wu et al. |
| 2021/0194908 A1 | 6/2021 | Wu et al. |
| 2021/0211466 A1 | 7/2021 | Sellers |
| 2021/0218714 A1 | 7/2021 | Wang et al. |
| 2021/0250368 A1 | 8/2021 | Hearty et al. |
| 2021/0288895 A1 | 9/2021 | Wu et al. |
| 2021/0288993 A1 | 9/2021 | Kraning et al. |
| 2021/0342337 A1 | 11/2021 | Lu et al. |
| 2021/0350276 A1 | 11/2021 | Ashlock et al. |
| 2021/0360004 A1 | 11/2021 | Mcgrew et al. |
| 2021/0360011 A1 | 11/2021 | O'hara et al. |
| 2022/0019688 A1 | 1/2022 | Nelluri et al. |
| 2022/0021694 A1 | 1/2022 | Higgins et al. |
| 2022/0029875 A1 | 1/2022 | Wu et al. |
| 2022/0053022 A1 | 2/2022 | Wu et al. |
| 2022/0060503 A1 | 2/2022 | Lee et al. |
| 2022/0060518 A1 | 2/2022 | Higgins et al. |
| 2022/0067177 A1 | 3/2022 | Chugunov |
| 2022/0070073 A1 | 3/2022 | Ball et al. |
| 2022/0070188 A1 | 3/2022 | Sheedy et al. |
| 2022/0094706 A1 | 3/2022 | Higgins et al. |
| 2022/0224716 A1 | 7/2022 | Salji |
| 2022/0239685 A1 | 7/2022 | Higgins et al. |
| 2022/0247771 A1 | 8/2022 | Higgins et al. |
| 2022/0345384 A1 | 10/2022 | Wu et al. |
| 2022/0407881 A1 | 12/2022 | Costlow et al. |
| 2023/0087451 A1 | 3/2023 | Rothstein et al. |
| 2023/0319047 A1 | 10/2023 | Wu et al. |
| 2024/0356926 A1 | 10/2024 | Wu et al. |
| 2025/0023914 A1 | 1/2025 | Wu et al. |

FOREIGN PATENT DOCUMENTS

| | | |
|---|---|---|
| AU | 2008328833 A1 | 6/2009 |
| CN | 105071987 A | 11/2015 |
| CN | 105323247 A | 2/2016 |
| CN | 106170008 A | 11/2016 |
| CN | 106341375 A | 1/2017 |
| CN | 107646190 A | 1/2018 |
| CN | 107667510 A | 2/2018 |
| CN | 106533665 B | 8/2018 |
| CN | 109104441 A | 12/2018 |
| CN | 109542772 A | 3/2019 |
| CN | 110113349 A | 8/2019 |
| CN | 107667510 B | 11/2020 |
| CN | 112085039 A | 12/2020 |
| CN | 112398876 A | 2/2021 |
| CN | 107646190 B | 3/2021 |
| DE | 69533953 | 3/2005 |
| DE | 69533953 T2 | 4/2006 |
| EP | 0702477 A2 | 3/1996 |
| EP | 0702477 A3 | 7/1999 |
| EP | 1026867 A2 | 8/2000 |
| EP | 1579629 A2 | 5/2004 |
| EP | 0702477 B1 | 1/2005 |
| EP | 2057576 A2 | 3/2008 |
| EP | 1579629 A4 | 11/2009 |
| EP | 2215801 B1 | 4/2011 |
| EP | 2057576 A4 | 4/2012 |
| EP | 3089424 A1 | 11/2016 |
| EP | 3094061 A1 | 11/2016 |
| EP | 3113443 A1 | 1/2017 |
| EP | 3306890 A1 | 4/2018 |
| EP | 3442164 A1 | 2/2019 |
| EP | 3477904 A1 | 5/2019 |
| EP | 3794800 A1 | 11/2019 |
| EP | 3834376 A1 | 2/2020 |
| EP | 3394784 B1 | 10/2020 |
| EP | 3272095 B1 | 3/2021 |
| EP | 3477904 B1 | 11/2021 |
| EP | 4218212 A1 | 3/2022 |
| EP | 3794800 B1 | 11/2022 |
| EP | 3089424 B1 | 6/2023 |
| EP | 3442164 B1 | 8/2023 |
| EP | 3834376 B1 | 9/2023 |
| FR | 2924552 A1 | 6/2009 |
| GB | 2545910 A | 7/2017 |
| GB | 2545910 B | 2/2018 |
| KR | 96-12819 A | 4/1996 |
| KR | 10-0388606 B1 | 11/2003 |
| KR | 10-2014-0093060 A | 7/2014 |
| KR | 10-1662614 B1 | 10/2016 |
| NZ | 586270 A | 12/2011 |
| WO | 2004/040423 A2 | 5/2004 |
| WO | 2004/040423 A3 | 7/2004 |
| WO | 2008/026212 A2 | 3/2008 |
| WO | 2009/015461 A1 | 2/2009 |
| WO | 2008/026212 A3 | 5/2009 |
| WO | 2009/068603 A2 | 6/2009 |
| WO | 2015/128613 A1 | 9/2015 |
| WO | 2016/118131 A1 | 7/2016 |
| WO | 2016/144932 A1 | 9/2016 |
| WO | 2016/146610 A1 | 9/2016 |
| WO | 2016/191486 A1 | 12/2016 |
| WO | 2017/108575 A1 | 6/2017 |
| WO | 2017/108576 A1 | 6/2017 |
| WO | 2018/204237 A1 | 11/2018 |
| WO | 2019/032137 A1 | 2/2019 |
| WO | 2019/083555 A1 | 5/2019 |
| WO | 2019/221911 A1 | 11/2019 |
| WO | 2020/033005 A1 | 2/2020 |
| WO | 2020/131740 A1 | 6/2020 |
| WO | 2022/066910 A1 | 3/2022 |

OTHER PUBLICATIONS

Office Communication for U.S. Appl. No. 17/516,063 mailed Apr. 19, 2024, 4 Pages.

(56) References Cited

OTHER PUBLICATIONS

Office Communication for U.S. Appl. No. 15/585,887 mailed Jun. 7, 2024, 4 Pages.
Office Communication for U.S. Appl. No. 17/516,063 mailed Jun. 4, 2024, 13 Pages.
Office Communication for U.S. Appl. No. 17/516,529 mailed Jul. 2, 2024, 12 Pages.
Office Communication for U.S. Appl. No. 17/826,011 mailed Jul. 8, 2024, 12 Pages.
Office Communication for U.S. Appl. No. 15/585,887 mailed Aug. 15, 2024, 45 Pages.
Extended European Search Report for European Patent Application No. 21873430.9 mailed Sep. 16, 2024, 14 Pages.
Pérez Eloy, "Kerberos (I): How does Kerberos work?—Theory", Mar. 20, 2019, BlackArrow, Tarlogic, Available online at <https://www.tarlogic.com/blog/how-kerberos-works/>, 23 pages.
Office Communication for U.S. Appl. No. 17/516,063 mailed Oct. 17, 2024, 13 Pages.
Office Communication for U.S. Appl. No. 17/826,011 mailed Oct. 24, 2024, 7 Pages.
Office Communication for U.S. Appl. No. 18/901,801 mailed Nov. 21, 2024, 21 Pages.
Office Communication for U.S. Appl. No. 15/585,887 mailed Jan. 15, 2025, 46 Pages.
Office Communication for U.S. Appl. No. 17/516,063 mailed Feb. 4, 2025, 7 Pages.
Office Communication for U.S. Appl. No. 17/516,063 mailed Jan. 6, 2025, 4 Pages.
Office Communication for U.S. Appl. No. 18/901,801 mailed Mar. 5, 2025, 12 Pages.
Office Communication for U.S. Appl. No. 15/585,887 mailed Apr. 10, 2025, 3 Pages.
Office Communication for U.S. Appl. No. 15/971,843 mailed Oct. 27, 2020, 11 Pages.
Office Communication for U.S. Appl. No. 15/984,197 mailed Aug. 31, 2018, 25 Pages.
Office Communication for U.S. Appl. No. 16/048,939 mailed Dec. 5, 2019, 9 Pages.
Office Communication for U.S. Appl. No. 16/048,939 mailed Feb. 18, 2020, 6 Pages.
Office Communication for U.S. Appl. No. 16/048,939 mailed Jun. 20, 2019, 8 Pages.
Office Communication for U.S. Appl. No. 16/048,939 mailed Mar. 26, 2020, 6 Pages.
Office Communication for U.S. Appl. No. 16/048,939 mailed Sep. 19, 2018, 9 Pages.
Office Communication for U.S. Appl. No. 16/100,116 mailed May 30, 2019, 5 Pages.
Office Communication for U.S. Appl. No. 16/100,116 mailed Nov. 15, 2018, 7 Pages.
Office Communication for U.S. Appl. No. 16/107,509 mailed Apr. 1, 2019, 21 Pages.
Office Communication for U.S. Appl. No. 16/107,509 mailed Aug. 21, 2019, 25 Pages.
Office Communication for U.S. Appl. No. 16/107,509 mailed Jan. 23, 2020, 12 Pages.
Office Communication for U.S. Appl. No. 16/107,509 mailed Jun. 14, 2019, 5 Pages.
Office Communication for U.S. Appl. No. 16/107,509 mailed Oct. 26, 2018, 26 Pages.
Office Communication for U.S. Appl. No. 16/113,442 mailed Jun. 5, 2019, 7 Pages.
Office Communication for U.S. Appl. No. 16/113,442 mailed Nov. 6, 2018, 10 Pages.
Office Communication for U.S. Appl. No. 16/174,051 mailed Jan. 29, 2019, 21 Pages.
Office Communication for U.S. Appl. No. 16/384,697 mailed May 30, 2019, 12 Pages.
Office Communication for U.S. Appl. No. 16/384,697 mailed Oct. 17, 2019, 8 Pages.
Office Communication for U.S. Appl. No. 16/424,387 mailed Feb. 24, 2020, 15 Pages.
Office Communication for U.S. Appl. No. 16/424,387 mailed Nov. 24, 2020, 23 Pages.
Office Communication for U.S. Appl. No. 16/459,472 mailed Aug. 14, 2019, 15 Pages.
Office Communication for U.S. Appl. No. 16/459,472 mailed Feb. 3, 2020, 7 Pages.
Office Communication for U.S. Appl. No. 16/525,290 mailed Jun. 15, 2021, 4 Pages.
Office Communication for U.S. Appl. No. 16/525,290 mailed Mar. 12, 2020, 10 Pages.
Office Communication for U.S. Appl. No. 16/525,290 mailed Mar. 31, 2021, 11 Pages.
Office Communication for U.S. Appl. No. 16/525,290 mailed Oct. 31, 2019, 9 Pages.
Office Communication for U.S. Appl. No. 16/525,290 mailed Sep. 23, 2020, 10 Pages.
Office Communication for U.S. Appl. No. 16/532,275 mailed Oct. 24, 2019, 29 Pages.
Office Communication for U.S. Appl. No. 16/543,243 mailed Apr. 7, 2020, 22 Pages.
Office Communication for U.S. Appl. No. 16/543,243 mailed Dec. 16, 2020, 13 Pages.
Office Communication for U.S. Appl. No. 16/543,243 mailed Sep. 27, 2019, 24 Pages.
Office Communication for U.S. Appl. No. 16/560,886 mailed Apr. 22, 2020, 10 Pages.
Office Communication for U.S. Appl. No. 16/560,886 mailed Dec. 6, 2019, 17 Pages.
Office Communication for U.S. Appl. No. 16/565,109 mailed Jan. 19, 2021, 9 Pages.
Office Communication for U.S. Appl. No. 16/565,109 mailed May 8, 2020, 19 Pages.
Office Communication for U.S. Appl. No. 16/565,109 mailed Nov. 27, 2019, 18 Pages.
Office Communication for U.S. Appl. No. 16/679,055 mailed Feb. 14, 2020, 32 Pages.
Office Communication for U.S. Appl. No. 16/679,055 mailed Jul. 26, 2021, 34 Pages.
Office Communication for U.S. Appl. No. 16/679,055 mailed Jun. 3, 2022, 34 Pages.
Office Communication for U.S. Appl. No. 16/679,055 mailed Mar. 16, 2021, 33 Pages.
Office Communication for U.S. Appl. No. 16/679,055 mailed Mar. 2, 2022, 35 Pages.
Office Communication for U.S. Appl. No. 16/679,055 mailed May 11, 2022, 3 Pages.
Office Communication for U.S. Appl. No. 16/679,055 mailed Nov. 12, 2021, 34 Pages.
Office Communication for U.S. Appl. No. 16/679,055 mailed Oct. 12, 2021, 3 Pages.
Office Communication for U.S. Appl. No. 16/679,055 mailed Sep. 21, 2022, 25 Pages.
Office Communication for U.S. Appl. No. 16/679,055 mailed Sep. 28, 2022, 2 Pages.
Office Communication for U.S. Appl. No. 16/679,055 mailed Sep. 4, 2020, 5 Pages.
Office Communication for U.S. Appl. No. 16/718,050 mailed Feb. 27, 2020, 21 Pages.
Office Communication for U.S. Appl. No. 16/718,050 mailed Jul. 27, 2021, 23 Pages.
Berners-Lee et al. "Uniform Resource Identifiers (URI): Generic Syntax" Network Working Group, Request for Comments: 2396, Aug. 1998, 40 pages.
Hamid et al., "A Methodology to Develop Dynamic Cost-Centric Risk Impact Metrics", Dec. 2015, International Conference on Developments of E-Systems Engineering, pp. 53-59 (Year: 2015).
Kristol et al. "HTTP State Management Mechanism", Network Working Group, Request for Comments: 2109, Feb. 1997, 21 Pages.
Kristol et al. "HTTP State Management Mechanism", Network Working Group, Request for Comments: 2965, Oct. 2000, 26 Pages.

(56) References Cited

OTHER PUBLICATIONS

Intention to Grant for European Application No. 16166907.2 mailed on Jan. 20, 2023, 8 Pages.
Intention to Grant for European Application No. 17210995.1 mailed on Jun. 2, 2021, 8 Pages.
Intention to Grant for European Patent Application No. 19804040.4 mailed Jun. 23, 2022, 8 Pages.
Intention to Grant for European Patent Application No. 17210996.9 mailed Mar. 29, 2023, 10 Pages.
Intention to Grant for European Patent Application No. 19846527.0 mailed Apr. 5, 2023, 9 Pages.
International Preliminary Report on Patentability Chapter I for International Patent Application No. PCT/US2017/068585 mailed May 7, 2020, 8 Pages.
International Preliminary Report on Patentability Chapter I for International Patent Application No. PCT/US2017/068586 mailed Feb. 20, 2020, 11 Pages.
International Preliminary Report on Patentability Chapter I for International Patent Application No. PCT/US2018/030145 mailed Nov. 14, 2019, 8 Pages.
International Preliminary Report on Patentability Chapter I for International Patent Application No. PCT/US2019/018097 mailed Feb. 18, 2021, 8 Pages.
International Preliminary Report on Patentability Chapter I for International Patent Application No. PCT/US2019/030015 mailed Dec. 3, 2020, 5 Pages.
International Preliminary Report on Patentability Chapter I for International Patent Application No. PCT/US2021/051757 mailed Apr. 6, 2023, 7 Pages.
Office Communication for U.S. Appl. No. 16/525,290 mailed Jul. 28, 2021, 2 Pages.
Office Communication for U.S. Appl. No. 16/048,939 mailed on Apr. 12, 2019, 5 Pages.
Office Communication for U.S. Appl. No. 17/708,311 mailed on Dec. 21, 2022, 4 pages.
Office Communication for U.S. Appl. No. 17/708,311 mailed on Jun. 2, 2023, 16 pages.
Office Communication for U.S. Appl. No. 17/708,311 mailed on Jun. 20, 2022, 15 pages.
Office Communication for U.S. Appl. No. 17/708,311 mailed on Oct. 5, 2022, 15 pages.
Office Communication for U.S. Appl. No. 17/708,311 mailed on Sep. 13, 2023, 11 pages.
Office Communication for U.S. Appl. No. 11/679,356 mailed Dec. 11, 2009, 23 Pages.
Office Communication for U.S. Appl. No. 11/679,356 mailed Feb. 22, 2010, 3 Pages.
Office Communication for U.S. Appl. No. 11/679,356 mailed Jun. 22, 2009, 21 Pages.
Office Communication for U.S. Appl. No. 11/679,356 mailed Mar. 4, 2011, 15 Pages.
Office Communication for U.S. Appl. No. 11/679,356 mailed Sep. 9, 2010, 27 Pages.
Office Communication for U.S. Appl. No. 14/500,893 mailed Apr. 28, 2015, 6 Pages.
Office Communication for U.S. Appl. No. 14/500,893 mailed Aug. 31, 2015, 7 Pages.
Office Communication for U.S. Appl. No. 15/014,932 mailed Dec. 19, 2018, 2 Pages.
Office Communication for U.S. Appl. No. 15/457,886 mailed Oct. 12, 2018, 3 Pages.
Office Communication for U.S. Appl. No. 15/466,248 mailed Sep. 27, 2018, 3 Pages.
Office Communication for U.S. Appl. No. 15/585,887 mailed Apr. 27, 2018, 25 Pages.
Office Communication for U.S. Appl. No. 15/585,887 mailed Jan. 15, 2019, 6 Pages.
Office Communication for U.S. Appl. No. 15/585,887 mailed Mar. 8, 2018, 6 Pages.
Office Communication for U.S. Appl. No. 15/585,887 mailed Nov. 18, 2019, 9 Pages.
Office Communication for U.S. Appl. No. 15/585,887 mailed Oct. 23, 2018, 27 Pages.
Office Communication for U.S. Appl. No. 15/585,887 mailed Sep. 3, 2019, 29 Pages.
Office Communication for U.S. Appl. No. 15/675,216 mailed Mar. 22, 2018, 9 Pages.
Office Communication for U.S. Appl. No. 15/694,229 mailed Jan. 9, 2019, 11 Pages.
Office Communication for U.S. Appl. No. 15/694,229 mailed Jul. 26, 2018, 16 Pages.
Office Communication for U.S. Appl. No. 15/793,880 mailed Mar. 1, 2018, 9 Pages.
Office Communication for U.S. Appl. No. 15/891,273 mailed Mar. 13, 2019, 6 Pages.
Office Communication for U.S. Appl. No. 15/891,311 mailed Dec. 11, 2018, 4 Pages.
Office Communication for U.S. Appl. No. 15/891,311 mailed Mar. 13, 2019, 2 Pages.
Office Communication for U.S. Appl. No. 15/893,519 mailed Dec. 12, 2018, 4 Pages.
Office Communication for U.S. Appl. No. 15/893,519 mailed Feb. 1, 2019, 21 Pages.
Office Communication for U.S. Appl. No. 15/893,519 mailed May 4, 2018, 10 Pages.
Office Communication for U.S. Appl. No. 15/893,519 mailed Sep. 27, 2018, 17 Pages.
Office Communication for U.S. Appl. No. 16/100,116 mailed Jul. 10, 2019, 4 Pages.
Intention to Grant for European Patent Application No. l9846527.0 mailed Apr. 5, 2023, 9 Pages.
Office Communication for U.S. Appl. No. 11/679,356 mailed Mar. 4, 2011, 8 Pages.
Office Communication for U.S. Appl. No. 16/113,442 mailed Mar. 22, 2019, 9 Pages.
Office Communication for U.S. Appl. No. 16/243,001 mailed Apr. 3, 2019, 16 Pages.
Office Communication for U.S. Appl. No. 16/391,216 mailed Jul. 8, 2019, 15 Pages.
Office Communication for U.S. Appl. No. 16/391,216 mailed Oct. 24, 2019, 16 Pages.
Office Communication for U.S. Appl. No. 16/424,387 mailed Oct. 18, 2019, 5 Pages.
Office Communication for U.S. Appl. No. 16/442,257 mailed Jul. 16, 2019, 11 Pages.
Office Communication for U.S. Appl. No. 16/989,025 mailed Jun. 8, 2022, 2 Pages.
Office Communication for U.S. Appl. No. 17/337,299 mailed Jun. 15, 2022, 2 Pages.
Office Communication for U.S. Appl. No. 17/483,148 mailed Mar. 2, 2022, 2 Pages.
Office Communication for U.S. Appl. No. 17/712,521 mailed Nov. 13, 2023, 8 Pages.
Office Communication for U.S. Appl. No. 17/712,521 mailed Oct. 11, 2023, 4 Pages.
Office Communication for U.S. Appl. No. 17/826,011 mailed Sep. 14, 2023, 13 Pages.
Office Communication for U.S. Appl. No. 15/466,248 mailed Apr. 15, 2019, 4 Pages.
Office Communication for U.S. Appl. No. 15/466,248 mailed Feb. 7, 2019, 32 Pages.
Office Communication for U.S. Appl. No. 15/585,887 mailed Sep. 11, 2023, 5 Pages.
Office Communication for U.S. Appl. No. 17/826,011 mailed Dec. 26, 2023, 11 Pages.
Examination Report for European Patent Application No. 16166907.2 mailed Mar. 9, 2018, 4 Pages.
Examination Report for European Patent Application No. 17210996.9 mailed May 21, 2021, 6 Pages.
Examination Report for European Patent Application No. 17210996.9 mailed May 27, 2020, 3 Pages.

(56) References Cited

OTHER PUBLICATIONS

Extended European Search Report for European Patent Application No. 16166907.2 mailed Sep. 30, 2016, 7 Pages.
Extended European Search Report for European Patent Application No. 17210995.1 mailed Jul. 6, 2018, 11 Pages.
Extended European Search Report for European Patent Application No. 17210996.9 mailed Jun. 13, 2018, 7 Pages.
Extended European Search Report for European Patent Application No. 19846527.0 mailed Apr. 4, 2022, 9 Pages.
International Search Report and Written Opinion for International Patent Application No. PCT/US2017/068585 mailed Jul. 4, 2018, 9 Pages.
International Search Report and Written Opinion for International Patent Application No. PCT/US2017/068586 mailed Aug. 9, 2018, 12 Pages.
International Search Report and Written Opinion for International Patent Application No. PCT/US2018/030145 mailed Aug. 10, 2018, 10 Pages.
International Search Report and Written Opinion for International Patent Application No. PCT/US2019/018097 mailed May 28, 2019, 9 Pages.
International Search Report and Written Opinion for International Patent Application No. PCT/US2019/030015 mailed Aug. 7, 2019, 6 Pages.
International Search Report and Written Opinion for International Patent Application No. PCT/US2021/051757 mailed Jan. 11, 2022, 8 Pages.
Office Communication for U.S. Appl. No. 16/525,290 mailed Jul. 9, 2021, 7 Pages.
Office Communication for U.S. Appl. No. 16/532,275 mailed Apr. 20, 2020, 8 Pages.
Office Communication for U.S. Appl. No. 15/855,769 mailed on May 1, 2019, 7 Pages.
Office Communication for U.S. Appl. No. 16/048,939 mailed on Jan. 31, 2019, 7 Pages.
Office Communication for U.S. Appl. No. 16/989,343 mailed Aug. 11, 2022, 9 Pages.
Office Communication for U.S. Appl. No. 16/989,343 mailed Aug. 17, 2022, 5 Pages.
Office Communication for U.S. Appl. No. 17/483,435 mailed Nov. 30, 2021, 21 Pages.
Office Communication for U.S. Appl. No. 17/721,514 mailed Jul. 21, 2022, 7 Pages.
Office Communication for U.S. Appl. No. 11/683,643 mailed Aug. 25, 2011, 43 Pages.
Office Communication for U.S. Appl. No. 13/831,908 mailed Jan. 13, 2014, 31 Pages.
Office Communication for U.S. Appl. No. 14/518,996 mailed Apr. 20, 2015, 37 Pages.
Office Communication for U.S. Appl. No. 14/695,690 mailed Sep. 9, 2015, 41 Pages.
Office Communication for U.S. Appl. No. 15/014,932 mailed Aug. 1, 2017, 27 Pages.
Office Communication for U.S. Appl. No. 15/014,932 mailed Mar. 3, 2017, 6 Pages.
Office Communication for U.S. Appl. No. 15/219,016 mailed Nov. 22, 2016, 12 Pages.
Office Communication for U.S. Appl. No. 15/443,868 mailed Aug. 11, 2017, 11 Pages.
Office Communication for U.S. Appl. No. 15/457,886 mailed Jan. 5, 2018, 11 Pages.
Office Communication for U.S. Appl. No. 15/585,887 mailed Aug. 28, 2020, 30 Pages.
Office Communication for U.S. Appl. No. 16/384,574 mailed Jan. 13, 2020, 8 Pages.
Office Communication for U.S. Appl. No. 16/384,574 mailed May 31, 2019, 12 Pages.
Office Communication for U.S. Appl. No. 16/384,574 mailed Oct. 8, 2019, 13 Pages.
Office Communication for U.S. Appl. No. 11/683,643 mailed Apr. 28, 2010, 35 Pages.
Office Communication for U.S. Appl. No. 11/683,643 mailed Jan. 23, 2012, 22 Pages.
Office Communication for U.S. Appl. No. 11/683,643 mailed Oct. 14, 2010, 43 Pages.
Office Communication for U.S. Appl. No. 12/326,672 mailed Dec. 23, 2010, 15 Pages.
Office Communication for U.S. Appl. No. 12/326,672 mailed Jun. 22, 2011, 16 Pages.
Office Communication for U.S. Appl. No. 12/326,672 mailed Jun. 9, 2010, 9 Pages.
Office Communication for U.S. Appl. No. 12/326,672 mailed Oct. 24, 2011, 9 Pages.
Office Communication for U.S. Appl. No. 13/831,626 mailed Sep. 3, 2013, 17 Pages.
Office Communication for U.S. Appl. No. 13/831,673 mailed Mar. 6, 2014, 12 Pages.
Office Communication for U.S. Appl. No. 13/831,673 mailed May 22, 2014, 5 Pages.
Office Communication for U.S. Appl. No. 13/831,673 mailed Sep. 30, 2013, 10 Pages.
Office Communication for U.S. Appl. No. 13/831,908 mailed Apr. 9, 2014, 3 Pages.
Office Communication for U.S. Appl. No. 13/831,908 mailed Aug. 9, 2013, 29 Pages.
Office Communication for U.S. Appl. No. 13/831,908 mailed Jun. 25, 2014, 15 Pages.
Office Communication for U.S. Appl. No. 13/831,959 mailed Aug. 22, 2013, 9 Pages.
Office Communication for U.S. Appl. No. 14/107,580 mailed Mar. 17, 2015, 5 Pages.
Office Communication for U.S. Appl. No. 14/107,580 mailed Mar. 6, 2014, 13 Pages.
Office Communication for U.S. Appl. No. 14/107,580 mailed Sep. 15, 2014, 15 Pages.
Office Communication for U.S. Appl. No. 14/107,631 mailed Dec. 30, 2014, 12 Pages.
Office Communication for U.S. Appl. No. 14/107,631 mailed Feb. 20, 2014, pp. 1-16
Office Communication for U.S. Appl. No. 14/107,631 mailed Sep. 26, 2014, pp. 1-14.
Office Communication for U.S. Appl. No. 14/500,893 mailed Feb. 18, 2015, 11 Pages.
Office Communication for U.S. Appl. No. 14/500,893 mailed Jun. 15, 2015, 12 Pages.
Office Communication for U.S. Appl. No. 14/500,893 mailed Nov. 20, 2014, 15 Pages.
Office Communication for U.S. Appl. No. 14/518,996 mailed Jul. 21, 2015, 17 Pages.
Office Communication for U.S. Appl. No. 14/518,996 mailed Nov. 20, 2014, 41 Pages.
Office Communication for U.S. Appl. No. 14/695,690 mailed Feb. 24, 2016, 11 Pages.
Office Communication for U.S. Appl. No. 14/750,905 mailed Jan. 19, 2016, 5 Pages.
Office Communication for U.S. Appl. No. 14/750,905 mailed Sep. 22, 2015, 12 Pages.
Office Communication for U.S. Appl. No. 15/014,932 mailed May 15, 2018, 23 Pages.
Office Communication for U.S. Appl. No. 15/014,932 mailed Dec. 14, 2016, 26 Pages.
Office Communication for U.S. Appl. No. 15/014,932 mailed Jul. 16, 2018, 4 Pages.
Office Communication for U.S. Appl. No. 15/014,932 mailed Jun. 10, 2016, 20 Pages.
Office Communication for U.S. Appl. No. 15/014,932 mailed Nov. 23, 2018, 10 Pages.
Office Communication for U.S. Appl. No. 15/082,925 mailed Feb. 1, 2017, 6 Pages.
Office Communication for U.S. Appl. No. 15/082,925 mailed Sep. 13, 2016, 7 Pages.

(56) References Cited

OTHER PUBLICATIONS

Office Communication for U.S. Appl. No. 15/150,354 mailed Feb. 8, 2017, 8 Pages.
Office Communication for U.S. Appl. No. 15/150,354 mailed Jul. 5, 2016, 18 Pages.
Office Communication for U.S. Appl. No. 15/207,213 mailed Feb. 23, 2017, 24 Pages.
Office Communication for U.S. Appl. No. 15/207,213 mailed Jun. 1, 2017, 24 Pages.
Office Communication for U.S. Appl. No. 15/207,213 mailed May 8, 2017, 6 Pages.
Office Communication for U.S. Appl. No. 15/207,213 mailed Oct. 25, 2016, 18 Pages.
Office Communication for U.S. Appl. No. 15/219,016 mailed Mar. 16, 2017, 9 Pages.
Office Communication for U.S. Appl. No. 15/289,760 mailed Dec. 12, 2016, 12 Pages.
Office Communication for U.S. Appl. No. 15/356,381 mailed Jan. 6, 2017, 57 Pages.
Office Communication for U.S. Appl. No. 15/356,381 mailed Jul. 3, 2017, 21 Pages.
Office Communication for U.S. Appl. No. 15/443,868 mailed Apr. 27, 2017, 7 Pages.
Office Communication for U.S. Appl. No. 15/457,886 mailed Jul. 18, 2018, 11 Pages.
Office Communication for U.S. Appl. No. 15/457,886 mailed Mar. 20, 2019, 9 Pages.
Office Communication for U.S. Appl. No. 15/466,248 mailed Jan. 11, 2018, 2 Pages.
Office Communication for U.S. Appl. No. 15/466,248 mailed Jul. 11, 2018, 31 Pages.
Office Communication for U.S. Appl. No. 15/466,248 mailed Jun. 5, 2017, 30 Pages.
Office Communication for U.S. Appl. No. 15/466,248 mailed Mar. 8, 2018, 34 Pages.
Office Communication for U.S. Appl. No. 15/466,248 mailed May 16, 2019, 33 Pages.
Office Communication for U.S. Appl. No. 15/466,248 mailed Oct. 18, 2018, 31 Pages.
Office Communication for U.S. Appl. No. 15/466,248 mailed Oct. 3, 2017, 34 Pages.
Office Communication for U.S. Appl. No. 15/466,248 mailed Sep. 10, 2019, 27 Pages.
Office Communication for U.S. Appl. No. 15/585,887 mailed Aug. 17, 2021, 41 Pages.
Office Communication for U.S. Appl. No. 15/585,887 mailed Dec. 22, 2022, 38 Pages.
Office Communication for U.S. Appl. No. 15/585,887 mailed Jan. 22, 2020, 28 Pages.
Office Communication for U.S. Appl. No. 15/585,887 mailed Jun. 27, 2017, 24 Pages.
Office Communication for U.S. Appl. No. 15/585,887 mailed Jun. 7, 2023, 43 pages.
Office Communication for U.S. Appl. No. 15/585,887 mailed Mar. 20, 2019, 26 Pages.
Office Communication for U.S. Appl. No. 15/585,887 mailed Mar. 24, 2022, 40 Pages.
Office Communication for U.S. Appl. No. 15/585,887 mailed Mar. 26, 2021, 31 Pages.
Office Communication for U.S. Appl. No. 15/585,887 mailed Nov. 2, 2021, 4 Pages.
Office Communication for U.S. Appl. No. 15/585,887 mailed Nov. 21, 2022, 6 Pages.
Office Communication for U.S. Appl. No. 15/585,887 mailed Nov. 28, 2017, 23 Pages.
Office Communication for U.S. Appl. No. 15/585,887 mailed Sep. 1, 2022, 39 Pages.
Office Communication for U.S. Appl. No. 15/671,060 mailed May 8, 2019, 19 Pages.
Office Communication for U.S. Appl. No. 15/675,216 mailed Aug. 28, 2018, 14 Pages.
Office Communication for U.S. Appl. No. 15/675,216 mailed Jan. 29, 2019, 8 Pages.
Office Communication for U.S. Appl. No. 15/675,216 mailed Jun. 7, 2018, 4 Pages.
Office Communication for U.S. Appl. No. 15/675,216 mailed Nov. 20, 2017, 7 Pages.
Office Communication for U.S. Appl. No. 15/690,135 mailed Jan. 18, 2018, 6 Pages.
Office Communication for U.S. Appl. No. 15/690,135 mailed May 22, 2018, 7 Pages.
Office Communication for U.S. Appl. No. 15/855,769 mailed Feb. 5, 2019, 10 Pages.
Office Communication for U.S. Appl. No. 15/891,273 mailed Jan. 15, 2019, 23 Pages.
Office Communication for U.S. Appl. No. 15/891,273 mailed Jun. 19, 2018, 20 Pages.
Office Communication for U.S. Appl. No. 15/891,273 mailed May 28, 2019, 14 Pages.
Office Communication for U.S. Appl. No. 15/891,311 mailed Apr. 23, 2018, 18 Pages.
Office Communication for U.S. Appl. No. 15/891,311 mailed Jan. 29, 2019, 8 Pages.
Office Communication for U.S. Appl. No. 15/891,311 mailed Sep. 24, 2018, 14 Pages.
Office Communication for U.S. Appl. No. 15/892,327 mailed Apr. 23, 2018, 6 Pages.
Office Communication for U.S. Appl. No. 15/971,843 mailed Jul. 28, 2021, 9 Pages.
Office Communication for U.S. Appl. No. 15/971,843 mailed Mar. 26, 2020, 14 Pages.
Office Communication for U.S. Appl. No. 15/971,843 mailed May 5, 2021, 9 Pages.
Office Communication for U.S. Appl. No. 15/971,843 mailed Oct. 22, 2019, 15 Pages.
Office Communication for U.S. Appl. No. 16/718,050 mailed Sep. 4, 2020, 23 Pages.
Office Communication for U.S. Appl. No. 16/813,649 mailed Apr. 1, 2022, 4 Pages.
Office Communication for U.S. Appl. No. 16/813,649 mailed Dec. 20, 2021, 44 Pages.
Office Communication for U.S. Appl. No. 16/813,649 mailed Feb. 24, 2021, 7 Pages.
Office Communication for U.S. Appl. No. 16/813,649 mailed May 11, 2022, 16 Pages.
Office Communication for U.S. Appl. No. 16/820,582 mailed Jan. 14, 2022, 13 Pages.
Office Communication for U.S. Appl. No. 16/820,582 mailed May 10, 2021, 24 Pages.
Office Communication for U.S. Appl. No. 16/820,582 mailed Sep. 27, 2021, 25 Pages.
Office Communication for U.S. Appl. No. 16/989,025 mailed Jan. 19, 2022, 12 Pages.
Office Communication for U.S. Appl. No. 16/989,025 mailed May 23, 2022, 14 Pages.
Office Communication for U.S. Appl. No. 16/989,343 mailed Mar. 29, 2022, 5 Pages.
Office Communication for U.S. Appl. No. 17/214,555 mailed Mar. 21, 2023, 25 Pages.
Office Communication for U.S. Appl. No. 17/214,555 mailed Nov. 10, 2022, 21 Pages.
Office Communication for U.S. Appl. No. 17/226,947 mailed Dec. 30, 2021, 6 Pages.
Office Communication for U.S. Appl. No. 17/226,947 mailed Jul. 11, 2022, 13 Pages.
Office Communication for U.S. Appl. No. 17/318,423 mailed Mar. 29, 2022, 21 Pages.
Office Communication for U.S. Appl. No. 17/318,423 mailed Sep. 13, 2022, 15 Pages.
Office Communication for U.S. Appl. No. 17/318,423 mailed Sep. 22, 2022, 2 Pages.

(56) References Cited

OTHER PUBLICATIONS

Office Communication for U.S. Appl. No. 17/337,299 mailed Feb. 17, 2022, 14 Pages.
Office Communication for U.S. Appl. No. 17/337,299 mailed Oct. 21, 2021, 34 Pages.
Office Communication for U.S. Appl. No. 17/351,866 mailed Feb. 9, 2022, 9 Pages.
Office Communication for U.S. Appl. No. 17/351,866 mailed Oct. 18, 2021, 12 Pages.
Office Communication for U.S. Appl. No. 17/483,148 mailed Dec. 13, 2021, 12 Pages.
Office Communication for U.S. Appl. No. 17/515,963 mailed Feb. 1, 2023, 2 Pages.
Office Communication for U.S. Appl. No. 17/515,963 mailed Jan. 24, 2023, 8 Pages.
Office Communication for U.S. Appl. No. 17/515,963 mailed Oct. 7, 2022, 27 Pages.
Office Communication for U.S. Appl. No. 17/516,063 mailed Aug. 11, 2023, 11 Pages.
Office Communication for U.S. Appl. No. 17/516,063 mailed Jul. 31, 2023, 3 Pages.
Office Communication for U.S. Appl. No. 17/516,063 mailed May 19, 2023, 10 pages.
Office Communication for U.S. Appl. No. 17/516,063 mailed Oct. 31, 2022, 10 Pages.
Office Communication for U.S. Appl. No. 17/712,521 mailed Aug. 2, 2023, 14 Pages.
Office Communication for U.S. Appl. No. 17/712,521 mailed Mar. 21, 2023, 13 Pages.
Office Communication for U.S. Appl. No. 17/721,514 mailed Oct. 11, 2022, 2 Pages.
Office Communication for U.S. Appl. No. 17/721,514 mailed Sep. 20, 2022, 8 pages.
Office Communication for U.S. Appl. No. 17/722,217 mailed Jul. 15, 2022, 7 Pages.
Office Communication for U.S. Appl. No. 17/722,217 mailed Jun. 29, 2022, 23 Pages.
Office Communication for U.S. Appl. No. 17/861,373 mailed Jan. 11, 2023, 10 Pages.
Office Communication for U.S. Appl. No. 17/861,373 mailed Jan. 19, 2023, 2 Pages.
Office Communication for U.S. Appl. No. 17/861,373 mailed Sep. 9, 2022, 18 Pages.
Examination Report for European Patent Application No. 16166907.2 mailed Dec. 19, 2019, 6 Pages.
Office Communication for U.S. Appl. No. 15/585,887 mailed Jan. 26, 2024, 44 Pages.
Office Communication for U.S. Appl. No. 17/516,063 mailed Feb. 7, 2024, 11 Pages.
Office Communication for U.S. Appl. No. 17/826,011 mailed Feb. 16, 2024, 6 Pages.
Office Communication for U.S. Appl. No. 17/516,529 mailed Feb. 29, 2024, 20 Pages.
Supplementary European Search Report for European Patent Application No. 19804040.4 mailed Jan. 25, 2022, 4 Pages.
Postel Jon, "Transmission Control Protocol", Darpa Internet Program, RFC: 793, Sep. 1981, 91 pages.
"Kerberos Overview—An Authentication Service for Open Network Systems," Cisco Systems, Inc., Jan. 19, 2006, https://www.cisco.comlclen/us/support/docs/security-vpn/kerberos/16087-1.html, Accessed: Feb. 9, 2022, pp. 1-16.
Beckett et al., "New Sensing Technique for Detecting Application Layer DDoS Attacks Targeting Back-end Database Resources," IEEE International Conference on Communications (ICC 2017), May 2017, 7 Pages.
Conry-Murray, Andrew, "Security Event Management Gets Specialized," Network Magazine, CMP Media, vol. 20, Nov. 2005, 6 Pages.
Digital Imaging and Communications in Medicine (DICOM), Part 6: Data Dictionary, PS 3.6-2011. 2011, http://dicorn.nerna.org/Dicom12011 111_06pu.pdf, pp. 1-216.
Fuertes, "Evaluation of OSPF Extensions in MANET Routing," Paris, 2007, 192 pages.
Handel et al., "Hiding Data in the OSI Network Model", Los Alamos, New Mexico, 1996, vol. 1174, pp. 23-38.
Handley et al., "Network Intrusion Detection: Evasion, Traffic Normalization, and End-to-End Protocol Semantics," 2011, International Computer Science Institute, 17 pages.
Health Level Seven, Version 2.6, Appendix A, Nov. 2007, 255 Pages.
Information Sciences Institute, "Internet Protocol Darpa Internet Program Protocol Specification," Sep. 1981, 36 pages.
Lin, Mark, "An Overview of Session Hijacking at the Network and Application Levels," Jan. 18, 2005, 16 Pages.
Mozilla Developer Network, "NSS Key Log Format," https://developer.mozilla,orgien-USIclocs/Mozilla/ProjectsINSSIKey_Log_Format, Jan. 8, 2010, p. 1.
Parsons, "Moving Across the Internet: Code-Bodies, Code-Corpses, and Network Architecture," May 9, 2010, 20 pages.
Shaver, Jim, "Decrypting TLS Browser Traffic with Wreshark the easy way", https://jimshaver.net/2015/02/11/decrypting-tls-browser-traffic-with-wireshark-the-easy-way/, Feb. 11, 2015, pp. 1-30.
Svoboda, Jakub, "Network Traffic Analysis with Deep Packet inspection Method," Masaryk University, Faculty of Informatics, Master's Thesis, 2014, 74 Pages.
Wade, Susan Marie, "SCADA Honeynets: The attractiveness of honeypots as critical infrastructure security tools for the detection and analysis of advanced threats" (2011). Graduate Theses and Dissertations. 12138. https://lib.dr.iastate.edu/etd/12138, 67 Pages.
Zander et al., "Covert Channels and Countermeasures in Computer Network Protocols," Dec. 2007, 7 pages.

\* cited by examiner

RESYNCHRONIZING ENCRYPTED NETWORK TRAFFIC

TECHNICAL FIELD

The present invention relates generally to network monitoring, and more particularly, but not exclusively, to resynchronizing encrypted network traffic.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In some cases, for various reasons, one or more network packets or portions of network packets may be missed or dropped by passive network monitors. Some network monitors may be disabled from performing conventional "dropped packet" mitigation, such as connection resets, resend requests, or the like because these network monitors may not be participants in the network flows being monitored. The prevalence of encrypted network traffic may be disadvantageous for enabling network monitors to recover from dropped packets or other disruptions. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
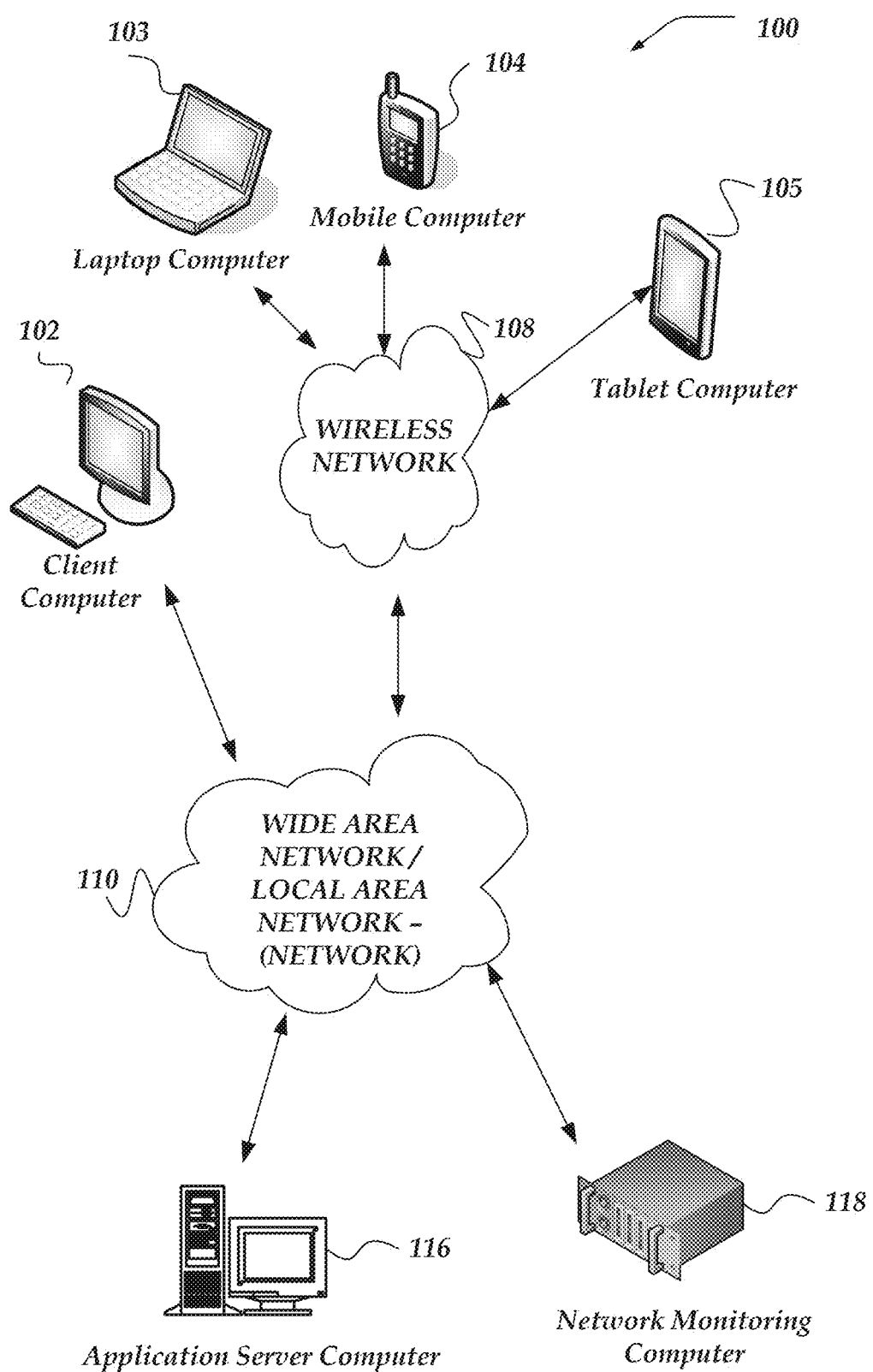
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PUP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated with the same user, application, client computer, source, destination, or the like.

As used herein, the terms "network monitor", "network monitoring computer", or "NMC" refer to an application (software, hardware, or some combination) that is arranged to monitor and record flows of packets in communicated between at least two endpoints over at least one network. NMCs may provide information for assessing different aspects of these monitored flows. In one or more embodiments, NMCs may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, regulatory compliance, or the like. NMCs may receive network communication for monitoring through a variety of means including network taps, wireless receivers, port mirrors or directed tunnels from network switches, clients or servers that include the endpoints themselves, or other infrastructure devices. In at least some of the various embodiments, NMCs may receive a copy of each packet on particular network segments or virtual local area networks (VLANs). Also, for at least some of the various embodiments, NMCs may receive these packet copies through port mirrors on managed Ethernet switches, e.g., Switched Port Analyzers (SPANs) port, Roving Analysis Ports (RAPs), or the like, or combination thereof. Port mirroring may enable analysis and debugging of network communications. Port mirroring may be performed for inbound or outbound traffic (or both) on single or multiple interfaces.

NMCs may track network connections from and to end points such as a client or a server. NMCs may also extract information from network packets including protocol information at various layers of communication protocol stacks. NMCs may reassemble or reconstruct the stream of data exchanged between the endpoints. In some cases, NMCs may perform decryption of the payload at various layers of the protocol stack. NMCs may passively monitor the network traffic, or it may participate in the protocols as a proxy. NMCs may attempt to classify the network traffic based on the communication protocols that are used.

NMCs may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, NMCs may use adaptive protocol classification techniques where information used to classify the protocols may be accumulated or applied over time to further classify the observed protocols. In some embodiments, NMCs may be arranged to employ stateful analysis. Accordingly, for each supported protocol, NMCs may use network packet payload data to drive a state machine that mimics the protocol state changes in the client/server flows being monitored. NMCs may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicate data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term "capture flow" refers to a network flow as observed or captured by an NMC. NMCs may capture network traffic from observed network flows. Accordingly, capture flows correspond to observed network flows. The distinction between network flows and capture flows is that NMCs do not directly participate in the connection or session associated with the network traffic of network flows. Rather, capture flows represent network traffic captured or observed from one or more network flows.

As used herein, the term "hole" refers to a gap in a capture flow that is not present in a corresponding network flow. Holes may be caused by errors or issues associated with the observation of network flows. If a hole is encountered, one or more packets or records of the observed network flow may be missed or omitted from the capture flow.

As used herein, the term, "cipher resynchronization parameters" refers to data structures or instructions associated with one or more methods that are determined to employ for resynchronization. The innovations below describe different strategies for resynchronizing for different types of encryption protocols. Accordingly, for brevity and clarity, the term cipher resynchronization parameters may be employed herein. In practice, particular values and instructions may be employed for particular encryption protocols such as exploring a range of sequence numbers, exploring a range of values to advance a stream cipher, or dealing with cipher-block-chaining.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the innovations disclosed herein to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to resynchronizing encrypted network traffic. In one or more of the various embodiments, a capture flow that includes network traffic captured from one or more network flows may be monitored such that the network traffic may be encrypted and such that the captured network traffic may be decrypted for analysis based on an encryption protocol.

In one or more of the various embodiments, a hole in the capture flow may be determined based on one or more gaps in one or more portions of the captured network traffic such that the hole disables the monitoring of the capture flow and the decryption of the captured network traffic.

In one or more of the various embodiments, a size of the hole may be determined based on a size of the or more gaps in the one or more portions of the captured network traffic.

In one or more of the various embodiments, other network traffic may be captured from the capture flow subsequent to the hole.

In one or more of the various embodiments, one or more secrets may be available to the NMC based on private keys configured for use with the NMC, or secrets delivered or made available to the NMC.

In one or more of the various embodiments, the one or more other portions of the captured network traffic may be decrypted based on the one or more cipher resynchronization parameters such that the decryption re-enables monitoring of the capture flow after the hole. In one or more of the various embodiments, determining the one or more cipher resynchronization parameters may include: determining one or more records included in the captured network traffic based on the encryption protocol; determining one or more sequence numbers based on the one or more records such that the one or more sequence numbers may be incremented for each record; generating one or more candidate sequence numbers based on the size of the hole, the one or more sequence numbers, an average length of the one or more records, or the like; determining a valid sequence number based on the one or more candidate sequence numbers and the one or more other portions of the captured network traffic such that the valid sequence number enables decryption of the one or more other portions of the captured network traffic after the hole; or the like.

In one or more of the various embodiments, determining the one or more cipher resynchronization parameters may include: determining a cipher block size based on the captured network traffic and the encryption protocol; determining candidate chained cipher data based on the one or more other portions of the captured network traffic, the cipher block size and the encryption protocol such that the candidate chained cipher data may be extracted from the one or more other portions of the captured network traffic; validating the candidate chained cipher data based on a verified decryption of the one or more other portions of the captured network traffic such that the valid chained cipher data enables decryption of the one or more other portions of the captured network traffic after the hole.

In one or more of the various embodiments, one or more application protocol parsers may be determined based on the decrypted captured network traffic such that the decrypted captured network traffic may be forwarded to the one or more application protocol parsers. In some embodiments, the decrypted the one or more other portions of the captured network traffic may be forwarded to the one or more application protocol parsers. In some embodiments, the one or more application protocol parsers may be notified that the hole was determined in the capture flow.

In one or more of the various embodiments, if each of the one or more cipher resynchronization parameters may be determined to be invalid based on the one or more other portions of the captured network traffic and the encryption protocol, the monitoring of the capture flow may be abandoned based on an absence of a successful decryption attempt.

In one or more of the various embodiments, monitoring the capture flow may include: determining one or more metrics associated with the captured network traffic, including one or more of a record count, an average record size, a record type, a cipher suite, a cipher mode, a cipher type, or a cipher version; further determining the one or more cipher resynchronization parameters based on the one or more metrics; or the like.

In one or more of the various embodiments, determining the hole in the capture flow may include, detecting one or more features in the capture flow, including one or more of an absence of capture flow traffic, an acquisition of a partial record, a missing record field, an incorrect record field, or an extended gap between two or more transport layer packets in the capture flow.

In one or more of the various embodiments, determining the one or more cipher resynchronization parameters may include: generating one or more candidate key stream advancement amounts based on the size of the hole and an average length of the one or more records; validating the one or more candidate key stream advancement amounts based on a verified decryption of the one or more other portions of the captured network traffic, wherein a valid key stream advancement amount enables decryption of the one or more other portions of the captured network traffic after the hole; or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiments, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
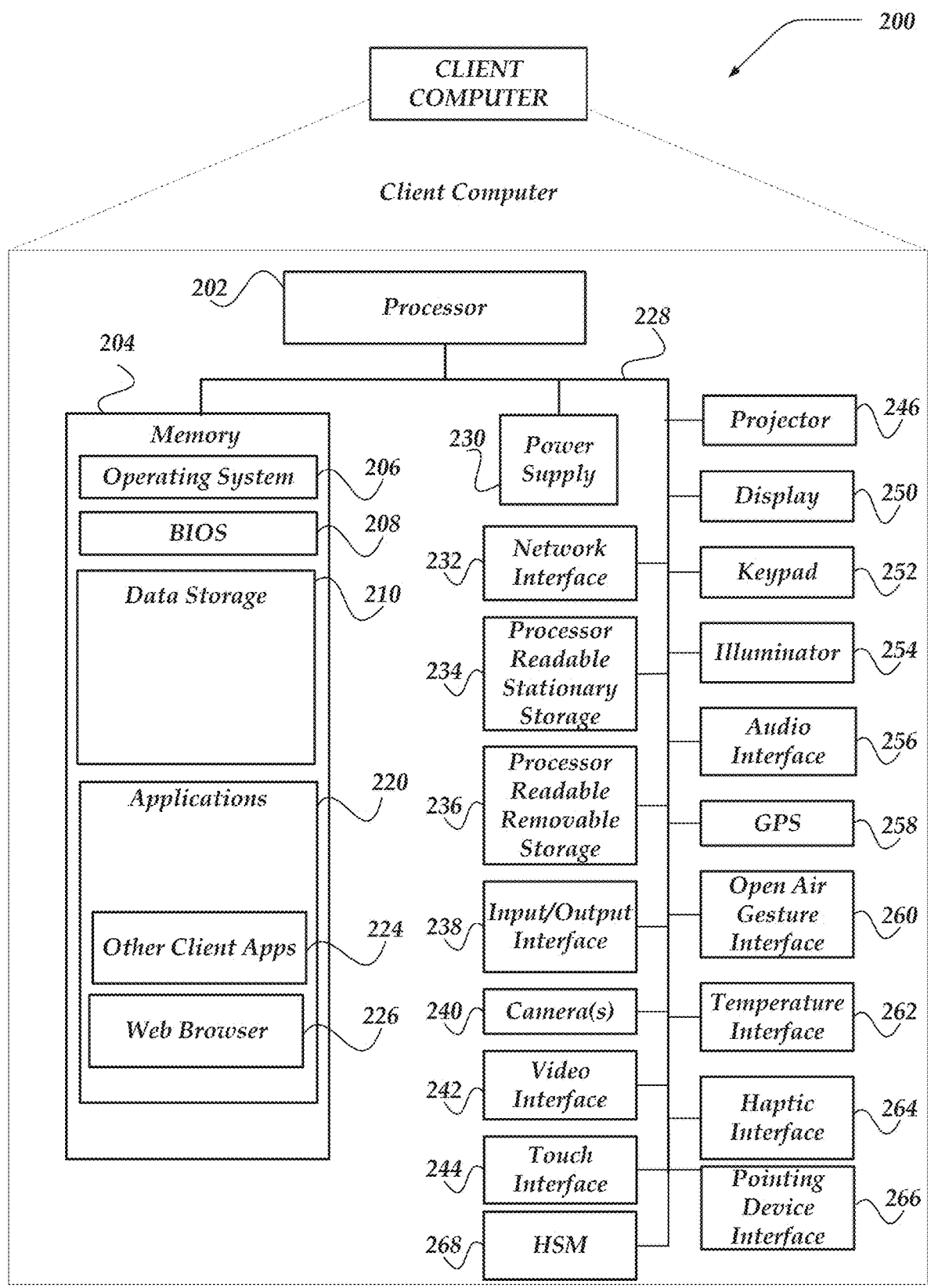
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
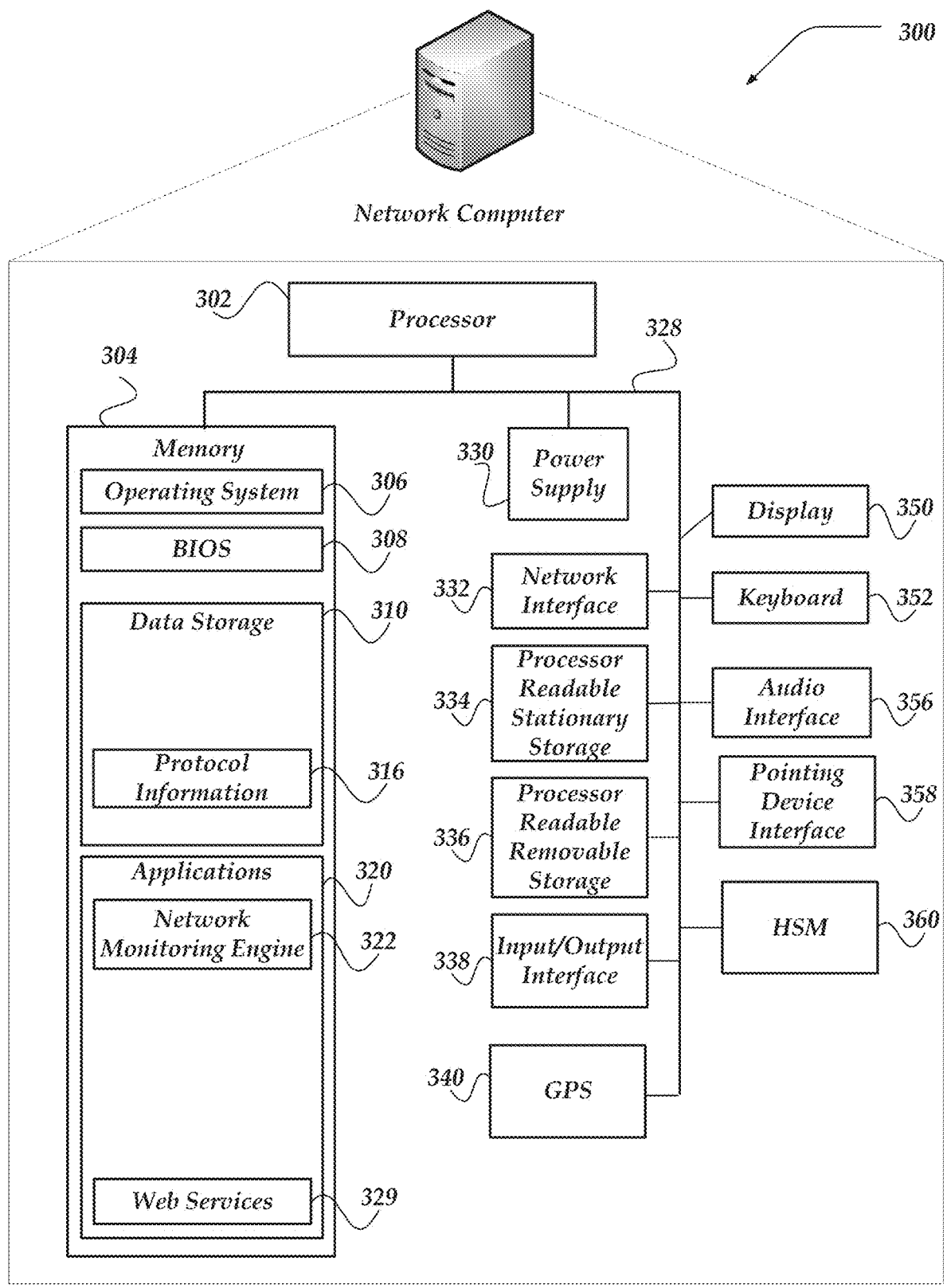
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, web services 329, or the like, may be arranged to employ geo-location information to select one or more localization features, such as, time zones, languages, currencies, calendar formatting, or the like. Also, localization features may be used when interpreting network traffic, monitoring application protocols, user-interfaces, generating reports, monitoring networks in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, protocol information 316, or the like. Protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, web services 329, or the like, may be provisioned and de-commissioned automatically.

Also, in one or more of the various embodiments, network monitoring engine 322, web services 329, or the like, may be located in virtual servers running in a cloud-based computing environment rather than being tied to one or more specific physical network computers. Likewise, in some embodiments, one or more of network monitoring engine 322, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
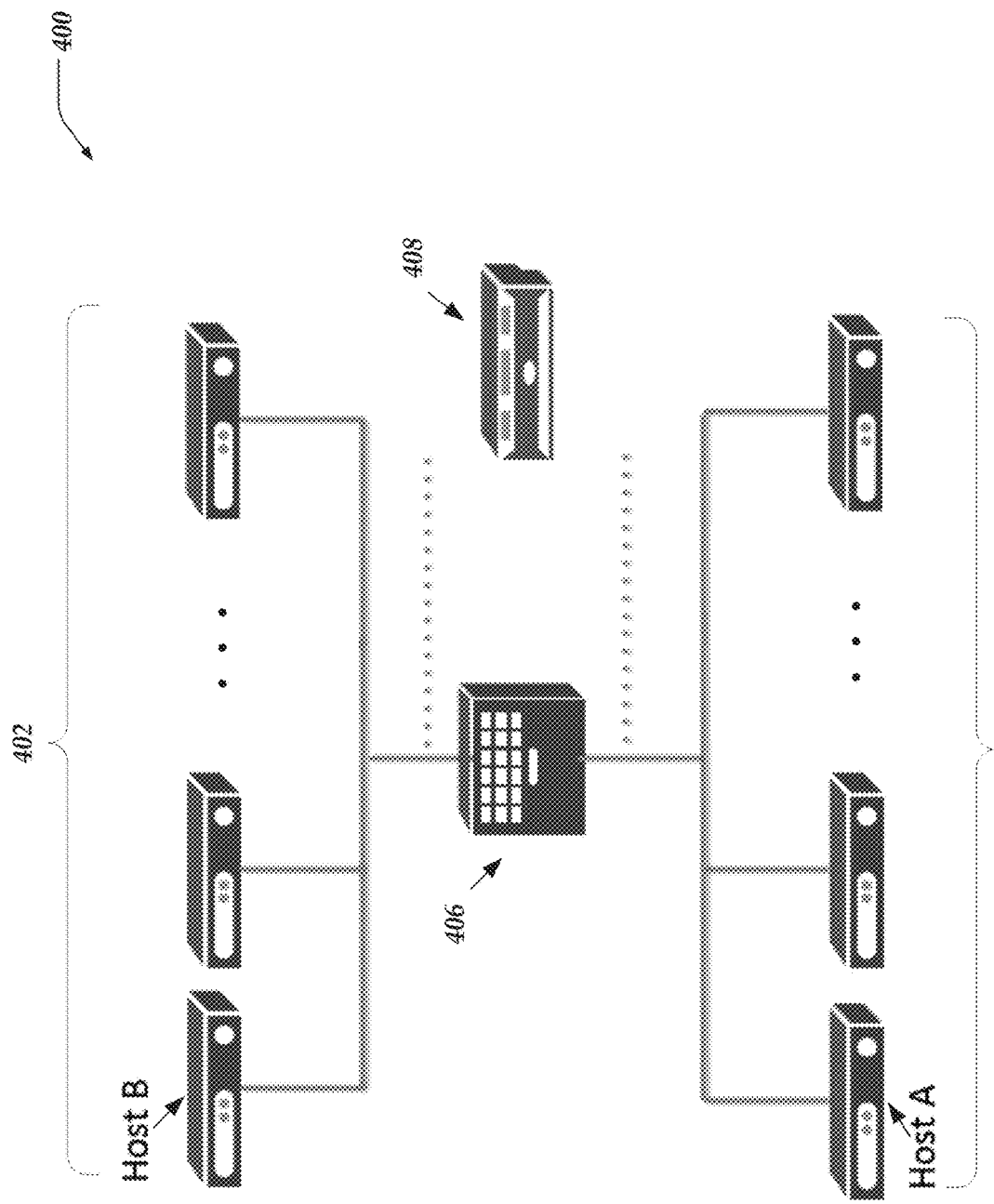
FIG. 4 illustrates a logical architecture of a system for resynchronizing encrypted network traffic in accordance with one or more of the various embodiments.

FIG. 4 illustrates a logical architecture of system 400 for resynchronizing encrypted network traffic in accordance with one or more of the various embodiments. System 400 may be arranged to include a plurality of network devices or network computers on first network 402 and a plurality of network devices or network computers on second network 404. In this example. communication between the first network and the second network is managed by switch 406. Also, NMC 408 may be arranged to passively monitor or record packets (network traffic) that are communicated in network flows between network devices or network computers on first network 402 and second network 404. For example, the communication of flows of packets between the Host B network computer and the Host A network computer are managed by switch 406 and NMC 408 may be passively monitoring or recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs, such as, NMC 408 may be arranged to generate or collect various metrics associated with monitored network traffic. Also, in one or more of the various embodiments, NMCs, such as, NMC 408 may be arranged to analyze some or all of the monitored network traffic to determine metrics or other characteristics associated with applications, services, endpoints, or the like, that may be associated with the monitored network traffic.

Figure 5:
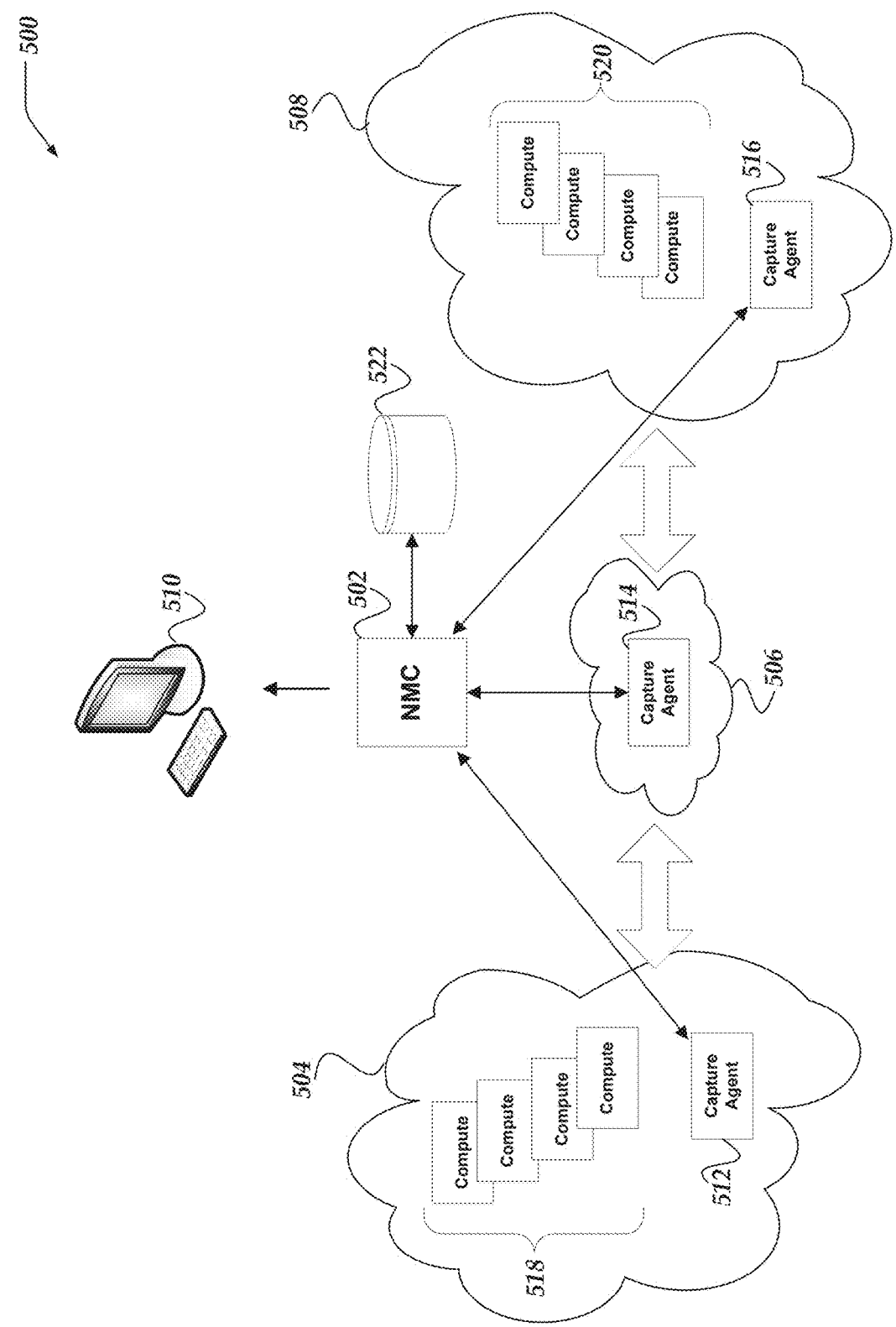
FIG. 5 illustrates a logical schematic of a system for resynchronizing encrypted network traffic in accordance with one or more of the various embodiments.

FIG. 5 illustrates a logical schematic of system 500 for resynchronizing encrypted network traffic in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, co-location computing environments, or the like, or combination thereof.

In one or more of the various embodiments, NMCs, such as NMC 502 may be arranged to communicate with one or more capture agents, such as, capture agent 512, capture agent 514, or capture agent 516. In some embodiments, capture agents may be arranged to selectively capture network traffic or collect network traffic metrics that may be provided to NMC 502 for additional analysis.

In one or more of the various embodiments, capture agents may be NMCs that may be distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be to arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522. In one or more of the various embodiments, NMCs may be arranged to employ rules, pattern matching, machine learning models, instructions, parameter settings, threshold/trigger values, or the like, provided via configuration information for monitoring or capturing network traffic.

Figure 6:
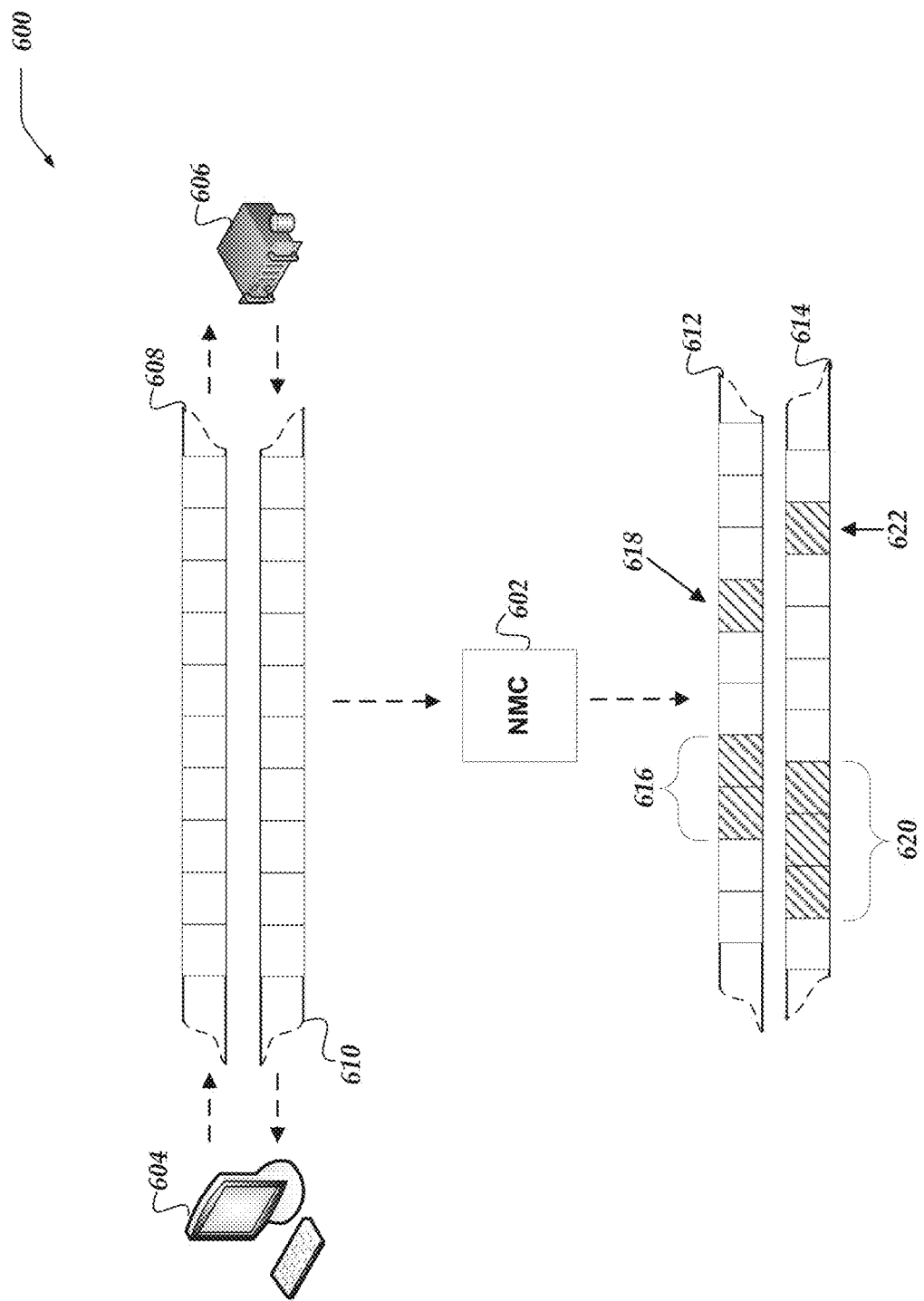
FIG. 6 illustrates a logical schematic of a system for resynchronizing encrypted network traffic in accordance with one or more of the various embodiments.

FIG. 6 illustrates a logical schematic of system 600 for resynchronizing encrypted network traffic in accordance with one or more of the various embodiments. As described above, NMCs may be arranged to passively monitor network traffic exchanged between various endpoints in or adjacent to monitored networking environments.

In some embodiments, NMCs such as NMC 602 may be arranged to monitor network traffic between one or more endpoints, such as client computer 604 or network computer 606. In this example, for some embodiments, flow 608 and flow 610 may represent network traffic being exchanged between client computer 604 and network computer 606.

Accordingly, in some embodiments, NMC 602 may be configured to monitor the contents of flow 608 or flow 610 to enable the collection of various metrics or signals associated with the network activity. The particular metrics or signals as well as responses thereto may vary depending on local policies or local circumstances. For example, in some embodiments, one or more metrics may be collected for evaluating the performance of monitored networks. Also, in some embodiments, one or more metrics may be collected to detect or predict if security policy violations or other threats may be occurring. (As described above.)

In some embodiments, NMCs may be enabled to generate metrics or other analysis based on monitoring the network traffic by capturing the traffic that may occur between network connection endpoints such as client computer 604 or network computer 606. In this example, for some embodiments, capture flow 612 or capture flow 614 represent the NMC's (NMC 602) view of the network traffic between client computer 604 and network computer 606.

In some embodiments, NMCs may be arranged to evaluate the network traffic in capture flow 612 or capture flow 614 to evaluate the network activity. In some embodiments, NMCs may be arranged to employ various application protocol parsers (not shown) to categorize or interpret the network traffic between endpoints. As described above, capture flows may be copies of network traffic that may be passively collected from the monitored network.

Accordingly, in some embodiments, it may be assumed that NMCs have recognized or categorized the relevant protocols. In some embodiments, this may include determining various attributes or characteristics of one or more encrypted protocols that may be included in monitored network traffic. For example, in some embodiments, NMCs may be arranged to determine cryptographic information, such as cipher suites, keying information, other secrets, cipher text block sizes, clear text block sizes, key stream lengths, or the like, for the monitored network traffic. In some cases, for some encryption protocols, NMCs may be arranged to determine the secrets/keying information directly from monitored traffic. For example, in some cases, NMCs may monitor both sides of a handshake process used to establish a secure session to determine some or all secrets. However, more commonly, NMCs may be configured to employ various secret sharing methods that enable session participants to share the secrets for decrypting monitored network traffic. For brevity and clarity, the details of secret sharing are omitted here as one may assume that the NMCs have the secrets or other information necessary for decrypting monitored/captured encrypted traffic. For example, in some embodiments, NMCs may be configured employ or access key escrows, embedded agents, other secret sharing mechanisms to enable decryption of particular encryption protocols. Note, if the NMC is disabled from decrypting a particular protocols or session, the NMC may be arranged to collect information, such as packet rate, session duration, payload size, total bytes exchanged, or the like, even if the NMC is disabled from decrypting the content of encrypted payloads.

In some cases, for some embodiments, one or more portions of monitored network flows may be dropped or lost while endpoints may be communicating. In such events, the endpoints may execute various mitigation actions, such as connection resets, resend requests, or other error handling. In some embodiments, error mitigation activity between the endpoints of a connection may be captured or observed by NMCs similar to other network traffic.

In some cases, for some embodiments, capture flows may miss or omit portions of the network flows for similar reasons as other packets may be dropped or omitted. However, in some embodiments, since NMCs may be passive participants in network communication sessions, NMCs may be disabled from triggering connection resets, sending resend commands, or the like, that active participants may be enabled to execute. Accordingly, in this example, for some embodiments, hole 616, hole 618, hole 620, or hole 622 may represent portions of capture flows that may be missing or omitted.

Conventionally, in some embodiments, NMCs may employ various methods to re-synchronize with the network traffic based on the transport protocols or application protocols being used. However, in many cases, network traffic may be encrypted such that missing portions of the capture flow may disable conventional decryption methods. For example, some protocols, such as TLS may require each endpoint of a connection to maintain a sequence number of each exchanged TLS record that may be used for decoding the traffic. Thus, for example, the encrypted traffic may not be decrypted absent the correct sequence numbers. Accordingly, in some embodiments, holes, such as hole 616, or the like, may cause NMCs to lose track of one or more values that may be important for decrypting capture flows. For example, for some embodiments, if the encrypted protocol requires an accurate sequence number to decrypt, having an unknown number of missed packets may cause NMCs to be disabled from decrypting the capture flows. For example, while hole 620 is represented as missing three packets, in practice the number of missed records may be unknown which for some protocols (e.g., TLS) may result in an unknown number of records being missed.

Further, in some embodiments, depending on the transport protocol, NMCs may be enabled to determine the size of the hole. For example, if the top level transport protocol may be TCP/IP, NMCs may be enabled to determine the size of holes based on TCP sequence numbers or other information that is included in unencrypted header fields of the TCP packets. However, in some embodiments, while the size of a hole may be determined, the number of records of other protocols that were lost to the hole may not be determinable for some protocols. For example, a hole that loses one TCP packet may include zero or more records of other protocols. If those protocols are encrypted or otherwise opaque it may not be known how many records were lost.

Other features beyond sequence numbers of various encryption protocols may be disrupted by holes that lose or drop portions of flows that may be critical for decrypting the captured traffic. For example, protocols that employ cipher-block-chaining, or the like, may be disrupted by the missing traffic associated with holes since secrets or information included in prior records may be required to decrypt subsequent records.

Accordingly, in some embodiments, NMCs may be arranged to execute various actions to re-synchronize with encrypted sessions it was previously enabled to decrypt before the one or more missed packets (e.g., holes) were encountered.

Figure 7:
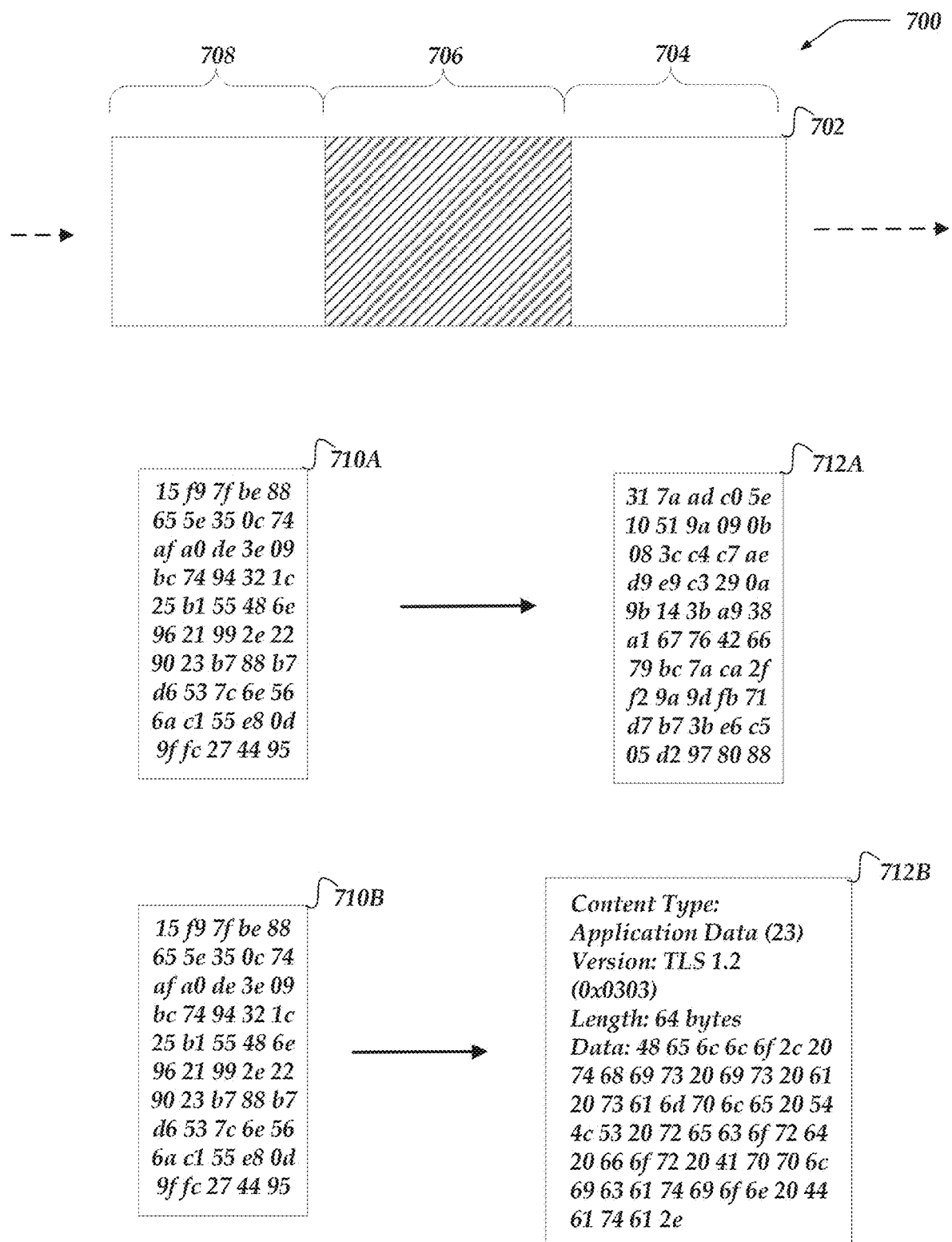
FIG. 7 illustrates a logical schematic for a system for resynchronizing encrypted network traffic in accordance with one or more of the various embodiments.

FIG. 7 illustrates a logical schematic for system 700 for resynchronizing encrypted network traffic in accordance with one or more of the various embodiments. In this example, for some embodiments, NMCs (not shown) may be configured to monitor network traffic as described above. Accordingly, for some embodiments, capture flow 702 may represent network traffic captured or otherwise provided to NMCs. Capture flow 702 may be considered a continuous flow with flow portion 704 representing traffic that may have been received and decrypted successfully. Hole 706 may represent a gap in the traffic based on an unknown number of packets or records being missed or omitted from the capture flow for various reasons. And, in this example, flow portion 708 may represent the portion of the capture flow that comes after hole 706. In this example, portion 704 or portion 708 may represent multiple packets or records. Likewise, hole 706 may correspond to gap of multiple packets or records.

Accordingly, in some embodiments, NMCs may be arranged to identify holes based on the occurrence of unexpected breaks in the traffic flow. Also, in some embodiments, NMCs may be arranged to determine the presence of holes if data streams unexpectedly fail decryption. For example, if payload data may be lost or sequence numbers become out-of-sync because of capture hole, NMCs may be disabled from decrypting subsequently captured data depending on the encryption protocol.

For example, if a protocol (e.g., some versions of TLS, or the like) requires connection endpoints to individually track and maintain sequence numbers based on the number of records exchanged, NMCs may be arranged to passively track the sequences numbers by counting the number of observed records. Accordingly, in some embodiments, if an NMC loses or misses an unknown number of records of the network traffic because of one or more holes, the sequence numbers tracked by the NMC may be incorrect because of the missed records. Thus, in some embodiments, the NMC may lose the ability to decrypt the encrypted traffic even if it still has access to the correct keys or some other secrets required by the protocol. In contrast, if the connection endpoints (e.g., session participants) experience dropped packets or other issues in their communication flows that may cause decryption issues, the endpoints may perform mitigation actions, such as connection resets, resend requests, or the like, to reestablish known sequence numbers.

In some embodiments, if a hole may be encountered in a capture flow, NMCs may be disabled from decrypting one or more protocols because the omitted traffic (traffic that would have filled the hole) may be required for decryption. For example, if a correct sequence number may be required for decrypting encrypted traffic, attempting decryption using an incorrect sequence number may result in indecipherable results.

Accordingly, in some embodiments, NMCs may be arranged to perform one or more actions to recover from holes to re-enable decryption of the capture flow. In some embodiments, the particular actions performed may vary depending on the encryption protocols. However, in some embodiments, before encountering a hole, it may be assumed NMCs have determined the relevant protocol and have access to other necessary secrets or keys used by the network flow participants to establish or maintain the encrypted network session.

In some embodiments, NMCs may be arranged to collect various metrics from capture flows, including average size of packets or records, rate of transmission, or the like. Note, these metrics, or the like, may be considered to be in addition to metrics or information required for decrypting capture flows.

In this example, for some embodiments, block 710A represents a portion of flow portion 708 that may be captured or observed subsequent to hole 706. Accordingly, in some embodiments, NMCs that attempt to decrypt block 710A absent required information, such as accurate sequence numbers, may generate block 712A representing a failed decryption attempt.

Also, in this example, block 710B represents the same captured data as block 710A. In some embodiments, if NMCs decrypt block 710B with the required information, such as correct sequence numbers, or the like, readable blocks, such as block 712B may be generated.

In some embodiments, if the protocol relies on sequence numbers, NMCs may be arranged to iterate through one or more candidate sequence numbers that may be predicted based on one or more metrics, such as, average record size, packet size, or the like. In some embodiments, each candidate sequence number may be employed (along with other known secrets or keys) to attempt to decrypt traffic captured subsequent to a hole. Accordingly, in some embodiments, if the decryption attempt fails (e.g., block 710A→block 712A), the NMC may advance to the next candidate sequence number and make another decryption attempt. Thus, in some embodiments, if the correct sequence number may be used (e.g., block 710B→block 712B), the NMC may determine that it has the correct sequence number and may continue decrypting the capture flow.

Similarly, in some embodiments, some encryption protocols may be designed to employ information from previous packets or records to encrypt subsequent packets or records (e.g., cipher-block-chaining, or the like). Accordingly, in some embodiments, NMCs may use one or more portions of prior packets or records in the capture flow to decrypt current packets or records in the capture flow. Thus, in some embodiments, missing packets or records because of a hole may disable decryption because the information required for decrypting current records may be lost to the hole. In some cases, an additional record may need to be captured to enable decryption with certain cipher modes like cipher-block-chaining or the like from the prior record to decrypt subsequent ciphertext included in the next records.

Accordingly, in some embodiments, NMCs may be arranged to track the average record size obtained before a hole may be encountered. Accordingly, in some embodiments, NMCs may be arranged to attempt decryption of data captured after a hole based on predicted record size. For example, if records received from flow portion 704 before hole 706 was encountered may be determined to have an average record size of 1200 bytes, the NMC may capture 1200 bytes from flow portion 708 to use in the decryption of the next candidate record from flow portion 708. In some embodiments, NMCs may be configured to iterate through one or more candidate record sizes, until the incoming record may be decrypted successfully. For example, in some embodiments, if the observed average record size before the hole was encountered may be 1200, NMCs may be configured attempt to use records sizes of 1100-1300 to attempt to decrypt the next encrypted record.

In some embodiments, NMCs may be assumed to have access to information which may be leverage to guide the hunt for key stream bytes. Accordingly, in some embodiments, NMCs may be arranged to hunt for the correct key stream for a record based on historical information determined before the disruptions caused by the holes.

Note, in some embodiments, the number of missed records included in a hole may be considered unknown to the NMC. Thus, in some embodiments, NMCs may be arranged to try one or more candidate sequence numbers, record sizes, amount of missing encrypted payload, key stream advancements, or the like, to hunt for the correct values for decrypting incoming records.

In some embodiments, NMCs may be configured to limit the amount of time or resources expended to re-synchronize a capture flow. Accordingly, in some embodiments, limits or boundaries may be established for the range of candidate sequence numbers that may be attempted. Likewise, in some embodiments, limits may be established for the range of record sizes or missing encrypted payload to be attempted for re-syncing for protocols that employ key stream methods, or the like. In some embodiments, the particular threshold limitations for various recovery operations may vary depending on the amount of hardware resources (e.g., buffer-sizes) that may be available for a particular capture flow. Likewise, in some embodiments, NMCs may be configured with limits that may depend on the particular applications, services, resources, or the like, that may be associated with a capture flow. For example, in some embodiments, if capture flows may be associated with network flows associated with critical or sensitive services or resources, NMCs may be configured to allocate more resources to re-synchronizing capture flows with those network flows after holes may be encountered.

Further, in some embodiments, NMCs may be arranged to evaluate network traffic that may have been archived or otherwise stored. For example, in some embodiments, NMCs may be arranged to collect some network monitoring metrics in real-time while archiving the entire traffic associated with monitored network flows. Accordingly, in some embodiments, NMCs may be arranged to load the traffic from file system, data store, or the like, where the captured traffic was stored. Thus, in some embodiments, holes may be determined based on timestamps or other similar markers or tags that may be included in the traffic archive. In such circumstances, for some embodiments, NMCs may be configured to loosen the range restrictions on candidate sequence numbers, missing encrypted payload, or record sizes because offline processing may be performed absent concerns that may be relevant for real-time processing. For example, in some embodiments, NMCs performing offline processing of traffic may not be in danger of over-running buffers or falling behind real-time traffic.

Also, in some embodiments, encrypted network flow records, such as TLS records, or the like, may carry data for one or more application protocols. Accordingly, in some embodiments, in normal operations, NMCs may be configured to decrypt the encrypted records and forward the application protocol contents to other protocol parsers specialized for the particular application protocols carried in the decrypted records. In some embodiments, NMCs may be configured to signal the protocol parsers that a hole was encountered. Accordingly, in some embodiments, the particular protocol parser may perform application protocol specific actions to attempt to recover from the hole. In some cases, application parsers may simply continue interpreting the application protocol traffic with a gap where the hole occurred. In other cases, in some embodiments, the application protocol parsers may be required to perform one or more hole re-synchronization actions that depend on the particular application protocol. For example, for some embodiments, one or more application protocols may employ additional application specific encryption or other security measures that application protocol parsers may have to re-sync with or reestablish after holes are encountered. Though, in some embodiments, after the NMC re-synchronizes the capture flow with the transport/carrier protocol, the application protocol parsers may be provided intact application protocol records. For example, in some embodiments, an NMC may resync with TLS records, such that each TLS record includes one or more application protocol packets. Thus, for example, the NMC may forward the one or more application packets extracted from the resynced TLS record to the appropriate application protocol parsers along with an indication that a hole occurred.

For example, in some embodiments, encrypted TLS records may include (or wrap) HTTP requests/responses. Accordingly, in some embodiments, if the NMCs re-synchronizes with the TLS capture flow, the HTTP traffic may be forwarded to parsers/handlers that may be specialized for HTTP along with a signal or indication that a hole was encountered.

Also, in some cases, for some embodiments, one or more application protocols may be encrypted using protocols that rely on sequence numbers, or the like, as described above. Accordingly, in such cases, in some embodiments, the application protocol parsers may perform sequence number hunting operations, or the like that may be similar to actions described above.

Note, the actual applications or services involved in the network flows being captured or monitored by NMCs may operate independent of NMC hole re-synchronization because the NMCs may be observing or listening to the network flows rather than participating in them. Thus, in some embodiments, the applications or services will be unaware of the NMCs actions to re-synch the capture flow. In contrast, if the actual network flow experiences dropped packets or other similar issues, the applications, services, or the transport layer may issue reset commands, resend commands, error responses, timeouts, or the like, that may be handled by the endpoints participating in the connection/session. Accordingly, if this may occur, in some embodiments, NMCs may follow along via the capture flow to reestablish decryption of the capture flows as the endpoints establish their encrypted sessions.

Figure 8:
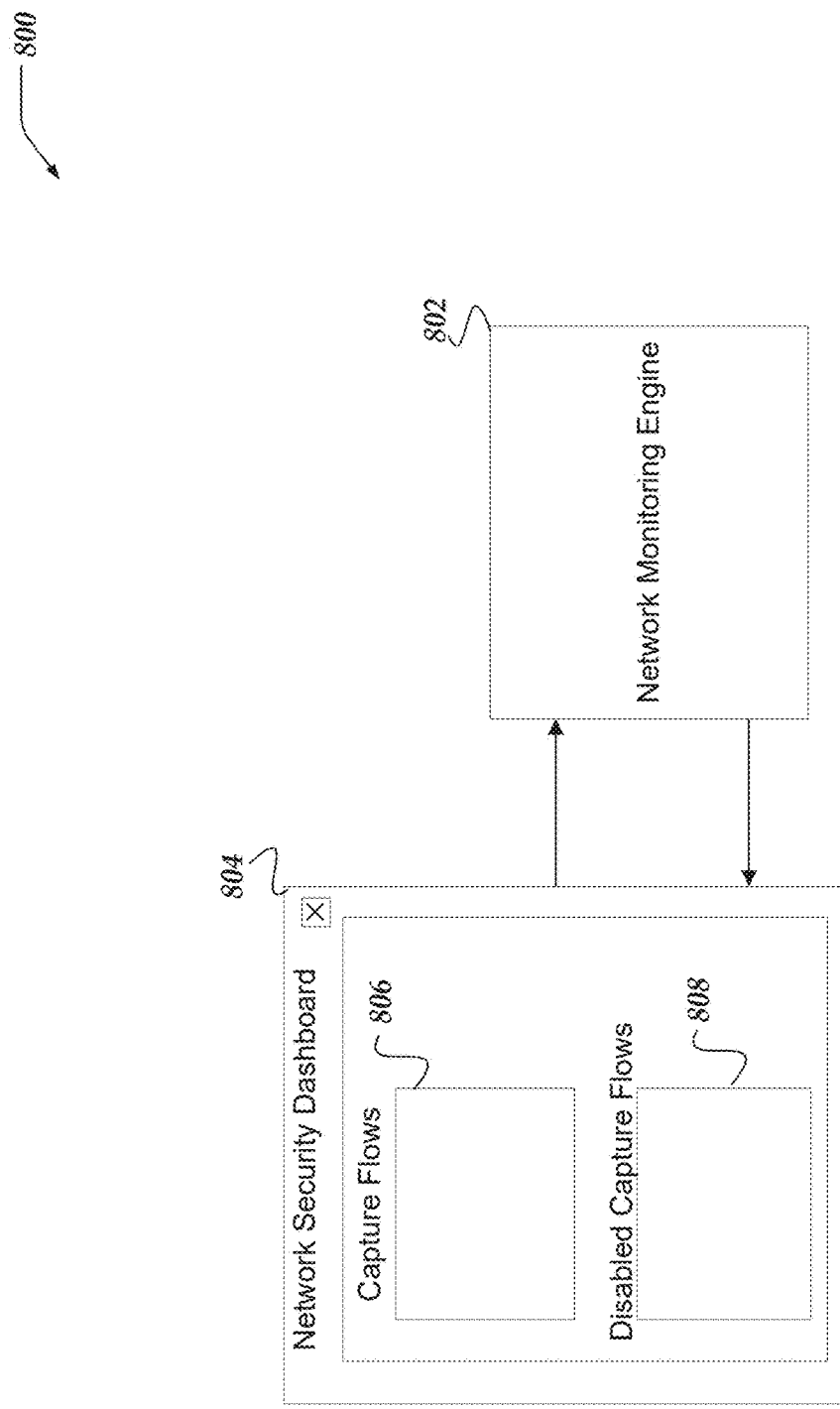
FIG. 8 illustrates a logical schematic of a system for resynchronizing encrypted network traffic in accordance with one or more of the various embodiments.

FIG. 8 illustrates a logical schematic of system 800 for resynchronizing encrypted network traffic in accordance with one or more of the various embodiments. System 800 may comprise various constituents, including: network monitoring engine 802; one or more client user interfaces, such as user interface 804; or the like.

In some embodiments, network monitoring engines may be arranged to provide one or more user interfaces such as user interface 804. In some embodiments, user interfaces may include various windows, controls, or other user interface features. In some embodiments, user interfaces may include various user interface panels, such as panel 806, panel 808, or the like. For example, in some embodiments, panel 806 may represent a user interface that enables network administrators to review or select a capture flow to review the status of the monitoring for the selected capture flow, or the like. Also, for example, panel 808 may represent a user interface that displays one or more disabled capture flows that may require resynchronization or other maintenance.

In some embodiments, network monitoring engine 802 may be arranged to generate or display user interface 804 to users using one or more of video interface 242, projector 246, display 250, or the like, of a client computer, such as client computer 200. Also, in some embodiments, network monitoring engine 802 may be arranged to generate or display user interface 802 to users using a one or more of input/output interface 338, display 350, audio interface 356, or the like, of a network computer, such as network computer 300.

In some embodiments, panel 806 may be arranged to display a rank ordered list of capture flows based on the various metrics, such as the amount of network traffic, or the importance of the associated resources. Note, in some embodiments, one of ordinary skill in the art will appreciate that organizations may have significant control or influence over the particular ranking criteria. For example, in some cases, one or more resources in the network may be considered more important than others. Accordingly, in some embodiments, some capture flows may be associated with different weights or ranks depending on the particular resources associated with the capture flows, or the like.

In some embodiments, for example, network monitoring engines, one or more client applications, or the like, may be arranged to generate one or more user interfaces that may dynamically be arranged to display one or more capture flows based on the associated resources, associated users, associated applications, or the like.

Note, for brevity and clarity, this example describes an application that displays one or more capture flows or disabled captured flows. However, one of ordinary skill in the art will appreciate the other types of information associated with network monitoring may be displayed. In some embodiments, network monitoring engines may be enabled to provide results based on user requests or user interactions. Thus, it should be clear that the innovations disclosed herein are not limited to displaying or determining the capture flows or disabled capture flows to a user.

In some embodiments, network monitoring engines may be arranged to collect various telemetry or other metrics associated with user interactions with user interfaces. In some embodiments, telemetry may include tracking if users may be interested in particular capture flows associated with particular resources, users, applications, or the like. For example, if users commonly interact with disabled capture flows ranked lower than others, it may indicate that the metrics employed for ordering capture flows in panel 808 may be deficient.

In one or more of the various embodiments, network monitoring engines may be arranged to monitor telemetry information associated with one or more users of user interface 804.

Accordingly, in some embodiments, network monitoring engines may be arranged to provide one or more facilities to collect direct feedback from one or more users that may interact with one or more capture flows or associated resources displayed in panel 806 or panel 808. For example, in some embodiments, user interfaces may include controls that enable authorized users to grade resource ordering or other display features. Likewise, in some embodiments, a user interface may be provided to grade the capture flow display ranking.

In some embodiments, grades or scores may be binary (e.g., like/dislike), discrete (e.g., one-four stars, letter grades), continuous values, or the like.

Also, in one or more of the various embodiments, network monitoring engines may be arranged to provide user interfaces that monitor how users interact with associated resources, capture flows, disabled capture flows, associated applications, associated protocols, or the like. In some embodiments, telemetry information employed to monitor user preferences may be based on monitoring user interactions as well as direct feedback. Accordingly, in some embodiments, capture flows or other information, or the like, that may be present in the user interface panels but are ignored or discarded by users may be inferred to be poorly received. For example, for some embodiments, if the top ranked capture flows displayed in panel 806, panel 808, or the like, are ignored or lower ranked capture flows are favored by users, it may be inferred that there may be a problem with the capture flow ordering for the current user interface.

Further, in some embodiments, network monitoring engines may be arranged to receive telemetry information from other services or applications. Accordingly, in one or more of the various embodiments, network monitoring engines are not required to directly monitor activity associated with the displayed capture flows or disabled capture flows, or the like. For example, for some embodiments, user interfaces may be displayed to users via desktop computer applications, mobile applications, web-based applications, or the like. In some embodiments, such applications may collect the telemetry information and provide some or all of it to network monitoring engines rather than requiring the network monitoring engines to include monitoring facilities on user-side application.

Accordingly, in some embodiments, network monitoring engine 802 may be arranged to collect metrics or telemetry associated with user interactions with user interface 804 using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Also, in some embodiments, network monitoring engine 802 may be arranged to collect metrics or telemetry associated with user interactions with user interface 804 using a one or more of input/output interface 338, GPS 340, keyboard 352, audio interface 356, pointing device interface 358, or the like, of a network computer, such as network computer 300.

In some embodiments, network monitoring engines may be arranged to track mouse movement, eye movement, keystrokes, or the like, to determine how users may interact with information (e.g., users, applications, capture flows, or the like) displayed in user interfaces. Accordingly, in some embodiments, network monitoring engines may be arranged to evaluate at least the quality of various displays, results, capture flows, or metrics based on how users interface with them. For example, if users consistently select or otherwise favor resources or capture flows ranked lower than others, it may indicate that one or more processes performing the ranking or matching may be experiencing diminished or diminishing effectiveness.

In some embodiments, network monitoring engines may be arranged to associate a performance score with various resynchronization methods employed for resynchronizing encrypted network traffic based on the user interaction metrics or telemetry. Accordingly, in some embodiments, if the performance score associated with particular resynchronization methods for one or more encryption protocols falls below a defined threshold value, network monitoring engines may be arranged to suspend those particular resynchronization methods from operation.

Also, in some embodiments, network monitoring engines may be arranged to arrange, re-arrange or adapt user interfaces based on user telemetry or metrics associated with the one or more user interactions with the network monitoring engine including content within the user interfaces. In some embodiments, user profiles may be configured to include user interface preferences based on collected metrics and user feedback. Accordingly, in some embodiments, network monitoring engines may be arranged to select, position, size, highlight, or style one or more user interface components based on one or more of user interaction metrics and user feedback. For example, if users are tracked focusing on or navigating to particular user interface views, components, or user interface panels, network monitoring engines may be arranged to highlight or size the preferred user interface elements or user interface panels. For example, if users are determined to rarely interact with a display panel such as display panel 806, network monitoring engines may be arranged to reduce the size and change the position of display panel 806 by displaying a smaller sized version below display panel 808 or increasing or decreasing the number of accessible capture flows shown in the panel.

Also, in some embodiments, network monitoring engines may be arranged to adapt user interfaces based on the size/type of display, input methods, user status, or the like. For example, in some embodiments, if a user is determined to be operating using a mobile device, one or more user interface elements may be positioned differently. In some cases, for some embodiments, depending on the display type, display orientation, or display size, one or more user interface elements may be hidden from view.

Accordingly, in some embodiments, network monitoring engines may be arranged to tangibly modify user interfaces, interactive reports, input collection, input selection, monitoring report, resource lists, activity reports, or the like, based on the efficient and effective performance of processes and/or activities associated with various types of encryption protocols or application protocols.

Generalized Operations

FIGS. 9-12 represent generalized operations for resynchronizing encrypted network traffic in accordance with one or more of the various embodiments. In one or more of the various embodiments, processes 900, 1000, 1100, and 1200 described in conjunction with FIGS. 9-12 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 9-12 may be used for resynchronizing encrypted network traffic in accordance with at least one of the various embodiments or architectures such as those described in conjunction with FIGS. 4-8. Further, in one or more of the various embodiments, some or all of the actions performed by processes 900, 1000, 1100, and 1200 may be executed in part by network monitoring engine 322, or the like, running on one or more processors of one or more network computers.

Figure 9:
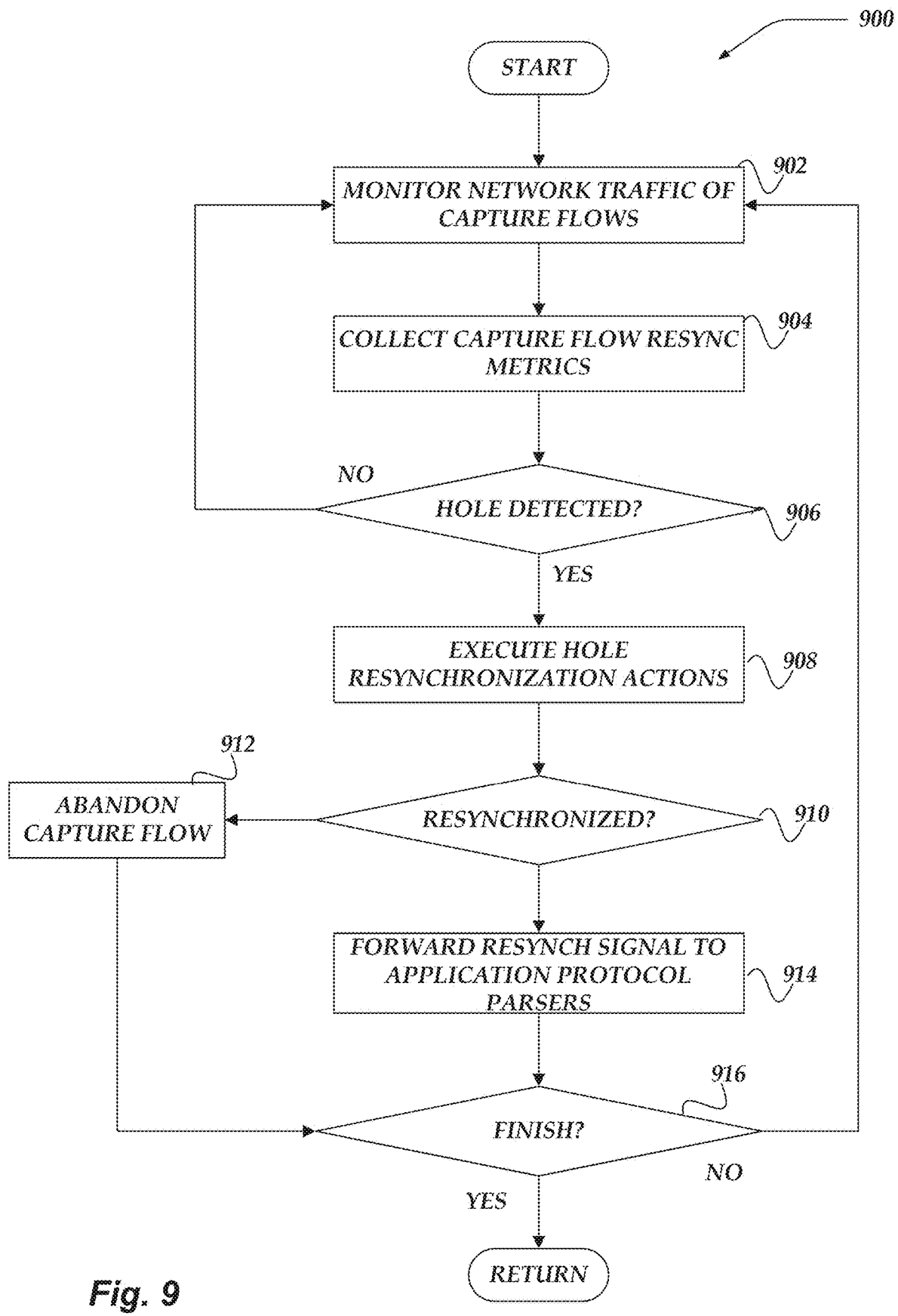
FIG. 9 illustrates an overview flowchart of a process for resynchronizing encrypted network traffic in accordance with one or more of the various embodiments.

FIG. 9 illustrates an overview flowchart of process 900 for resynchronizing encrypted network traffic in accordance with one or more of the various embodiments. After a start block, at block 902, in one or more of the various embodiments, NMCs may be arranged to monitor network traffic in one or more networks. As described above, NMCs may be arranged to monitor network traffic in a network environment. Accordingly, in some embodiments, NMCs may collect a variety of metrics associated with the one or more network flows that comprise network traffic in monitored networks. Further, in some embodiments, NMCs may be arranged to analyze patterns, features, contents, or the like, of network traffic associated with one or more network flows. In some embodiments, NMCs may be arranged to track requests/responses between endpoints to determine the protocols that may be in use or evaluate if the network traffic matches expectations or policies that may be associated with various protocols. Note, as mentioned above, protocols detected or monitored by NMCs may be one or one or more of data-link layer protocols, transport protocols, application protocols, or the like. Accordingly, for brevity or clarity they may be referred to herein as protocols.

In some embodiments, NMCs may be provided network traffic mirrored or copied from monitored network flows. Accordingly, in some embodiments, such flows may be referred to as capture flows because they may be considered to be provided to NMCs absent direct participation in the session network flows. For example, NMCs or other network infrastructure may provide observation ports that may provide capture flows.

Also, in some embodiments, NMCs may be arranged to obtain or receive network traffic that has been previously captured and stored rather than being limited to real-time capture flows.

At block 904, in one or more of the various embodiments, NMCs may be arranged to collect one or more resynchronization metrics based on the capture flow.

As described above, in some embodiments, NMCs may be configured to collect various metrics or other information associated with the monitored network flows. In some embodiments, NMCs may be configured to select particular metrics or information based on one or more local policies. For example, in some embodiments, different metrics or information may be prioritized over other metrics depending on the local policies of organizations employing NMCs. However, in some embodiments, one or more metrics may be collected for resynchronization of capture flows. In some cases, these metrics may be collected regularly or normally, however, particular metrics such as average record size, sequence numbers, cipher secrets, or the like, may be expressly collected to support resynchronizing encrypted network traffic. Also, in some embodiments, NMCs may be arranged to buffer one or more records to support decryption of encryption protocols that employ cipher-block-chaining or otherwise employ information or secrets from one or more prior records to decrypt present/current records.

Further, in some embodiments, NMCs may be arranged to employ various secret sharing methods for exchanging or sharing cryptographic keys, secrets, or the like, to support various encryption protocols. For brevity or clarity details of such methods are omitted here. However, one of ordinary skill in the art will appreciate that NMCs may be arranged to support such features, including integration with key escrows, or the like.

Note, it may be assumed that NMCs have full knowledge of the encryption protocols, transport protocols, or the like, used by a network flow and the corresponding capture flow. Thus, in some embodiments, NMCs may be enabled to collect the necessary resynchronization metrics based on detailed knowledge of the protocols being used. In the case that the NMCs may be unable to identify the protocols or perform decryption because of an absence of keys or secrets, the NMCs may be disabled from gathering detailed information from the capture flows.

At decision block 906, in one or more of the various embodiments, if a hole in the capture flow may be detected, control may flow to block 908; otherwise, control may loop back to block 902. In some embodiments, NMCs may be arranged to observe records as they may be provided in capture flow. Accordingly, in some embodiments, NMCs may be arranged to detect holes based on various features observed in the capture flow, including the absence of capture flow traffic, the acquisition of partial records, missing or incorrect record fields, extended gaps between transport layer packets, or the like, or combination thereof. Note, the particular method for detecting the occurrence of a hole may vary depending on various factors, including, the protocols being employed, method of capture, or the like. In some embodiments, NMCs may be arranged to be adaptable to the introduction of new or different detection methods for different protocols or evolving capture scenarios. Accordingly, in some embodiments, NMCs may be arranged to employ rules, instructions, tests, heuristics, or the like, for detecting holes that may be provided via configuration information to account for local circumstances or local requirements.

At block 908, in one or more of the various embodiments, NMCs may be arranged to execute one or more actions to resynchronize with capture flow. As mentioned above, in some embodiments, NMCs may be assumed to have knowledge of the protocols being used before encountering holes. Accordingly, in some embodiments, NMCs may be arranged to select one or more methods for resynchronizing encrypted network traffic based on the particular protocols that may be used by the network flows being monitored.

In some embodiments, NMCs may be arranged to be adaptable to the introduction of new or different resynchronization methods for different protocols or evolving hole scenarios. Accordingly, in some embodiments, NMCs may be arranged to employ rules, instructions, tests, heuristics, or the like, for resynchronizing encrypted network traffic that may be provided via configuration information to account for local circumstances or local requirements.

At decision block 910, in one or more of the various embodiments, if the NMC has resynchronized with the capture flow, control may transfer to block 914; otherwise, control may transfer to block 912.

In some cases, for some embodiments, NMCs may be unable to resynchronize a capture flow. For example, for some embodiments, some protocols may be resistant or otherwise unsuitable for resynchronization. Thus, in some cases, NMCs may be disabled from attempting resynchronization depending on the protocols involved.

Also, in some embodiments, holes may have duration or size that exceeds a configured threshold duration or size value. Accordingly, in some embodiments, NMCs may be configured to bypass resynchronization attempts in such circumstances or similar circumstances.

Further, in some embodiments, NMCs may be configured to attempt a limited number of resynchronization attempts. Accordingly, in some embodiments, if the number of attempts for a given resynchronization method may be exhausted, NMCs may cease resynchronization efforts.

In some embodiments, NMCs may be arranged to employ rules, threshold values, instructions, conditions, or the like, to determine if resynchronization attempts should continue provided from configuration information to account for local circumstances or local requirements. For example, in some embodiments, the number of resynchronization attempts for capture flows associated with critical infrastructure may be more than the number of attempts for less critical infrastructure. Similarly, in some cases, NMCs may be arranged to modify the number of resynchronization attempts based on the current utilization of the NMC's resources. For example, in some embodiments, if the NMC has excess performance capacity (e.g., unused buffer space, under utilized CPU, or the like), the NMC may be arranged to increase the number of resynchronization attempts.

At block 912, in one or more of the various embodiments, NMCs may be arranged to abandon the capture flow. In some embodiments, NMCs may be arranged to abandon decryption or some other processing of capture flows if resynchronization has failed. In some embodiments, NMCs may be arranged to signal downstream protocol parsers that capture flows associated with the abandoned resynchronization efforts.

Also, in some embodiments, even though resynchronization may be abandoned such that the NMC does not decrypt the network traffic provided by capture flows, NMCs may be arranged to continue to collect one or more metrics that may be collected from the encrypted traffic. For example, in some embodiments, NMCs may be configured to monitor the duration of connection sessions, amount of traffic exchanged, rate of network traffic exchanges, or the like, rather than abandoning the capture flows completely.

Next, control may be transferred to decision block 916.

At block 914, in one or more of the various embodiments, NMCs may be arranged to forward a resynchronization signal to one or more protocol parsers. As described above, NMCs may be arranged to forward decrypted records to other protocol parsers that process application protocols, or the like, that may be carried in the decrypted records. Accordingly, in some embodiments, NMCs may be arranged to notify these parsers that a hole was encountered. Thus, in some embodiments, the protocol parsers may be enabled to handle the gaps in the application protocol traffic caused by the hole. In some embodiments, application protocol parsers may inject the signal into the output stream, increment metrics to track the occurrence/location of holes, initiate one or more application protocol specific resynchronization actions, or the like.

In some cases, in some embodiments, application protocol parsers may be unable to resynchronize with the application protocol traffic depending on the particular protocol. Accordingly, in some embodiments, application protocol parsers may signal the NMC that application level protocol parsing may be disabled. Thus, in some embodiments, NMCs may be configured to perform one or more actions, such as abandoning the associated capture flows, or the like.

At decision block 916, in one or more of the various embodiments, if the NMCs may be finished monitoring the network, control may be returned to a calling process; otherwise, control may loop back block 902.

Figure 10:
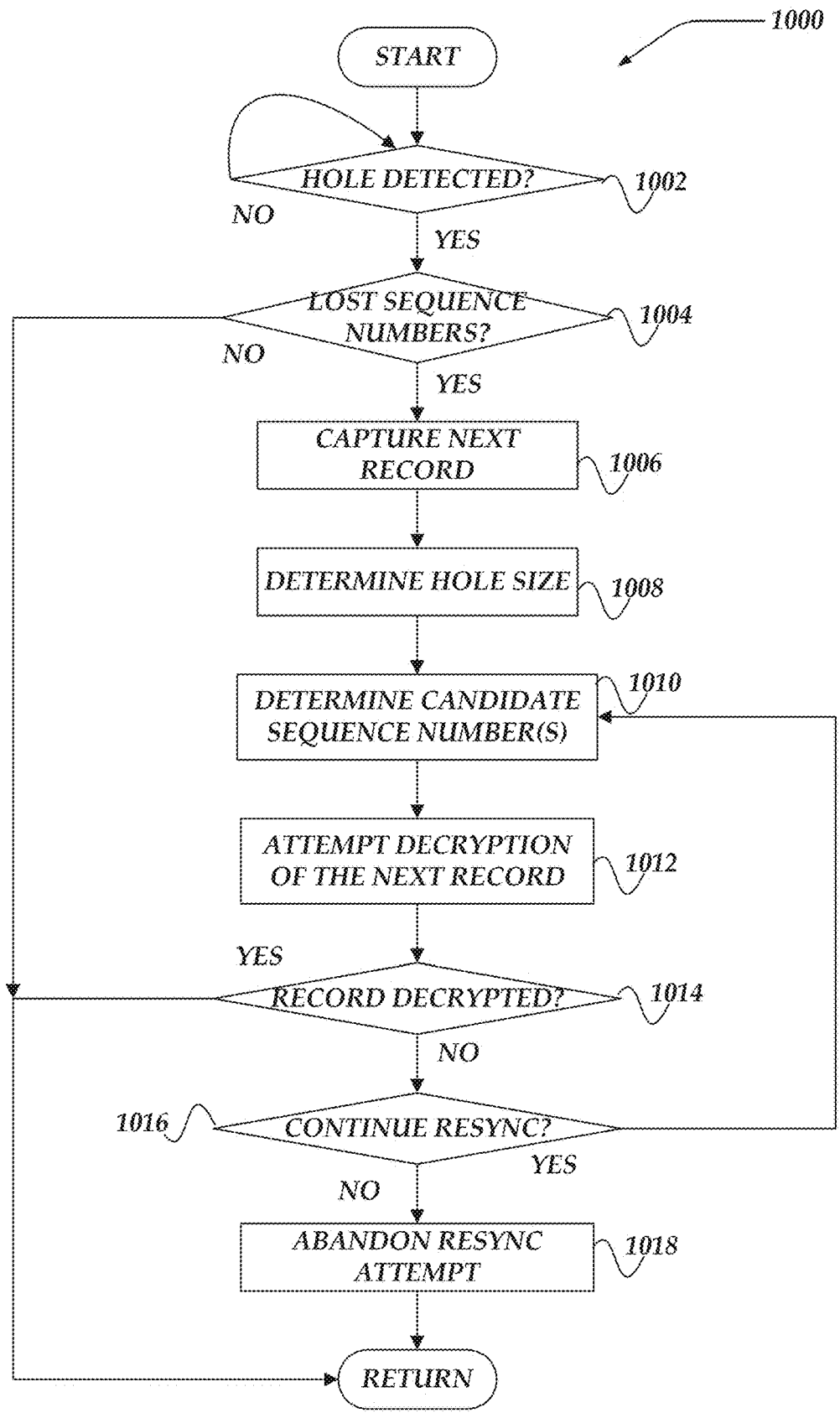
FIG. 10 illustrates a flowchart of a process for resynchronizing encrypted network traffic in accordance with one or more of the various embodiments.

FIG. 10 illustrates a flowchart of process 1000 for resynchronizing encrypted network traffic in accordance with one or more of the various embodiments. After a start block, at decision block 1002, in one or more of the various embodiments, if a hole in a capture flow may be detected, control may transfer to decision block 1004; otherwise, control may loop back to decision block 1002. As described above, NMCs may be arranged to employ various detection methods for determining if a hole in a capture flow has been encountered. For example, in some embodiments, an NMC may detect an unexpected break in the capture flow traffic. Or, for example, an NMC may determine the occurrence of a hole based on the failure to successfully decrypt a record from a capture flow.

At decision block 1004, in one or more of the various embodiments, if NMCs have lost track of one or more sequence numbers, control may transfer to block 1006; otherwise, control may be returned to a calling process.

In some embodiments, NMCs may be configured to monitor network flows that employ encryption protocols (e.g., TLS, or the like) that, among other things, may rely on each participant in the session maintaining a sequence number based on the number of records exchanged in the during the session. For example, some encryption protocols may require the correct sequence number along with other protocol specific secrets to encrypt or decrypt records. Thus, if the correct sequence number my be unknown, endpoints may be disabled from encrypting or decrypting the traffic correctly. Note, these protocols may be different from other protocols, such as TCP that may include the correct sequence number in each exchanged record.

Accordingly, in some embodiments, for such protocols NMCs may be arranged to compute or otherwise maintain a sequence number based on a count of the captured and successfully decrypted records that may be provided from the capture flows. Thus, in some embodiments, if a hole occurs, NMCs may miss an unknown number of records. For example, if the current sequence number is known by the NMC and the endpoints of the monitored network flow exchange ten records, but a hole in the capture flow causes one or more records to be dropped or otherwise missed one or more records, the NMC may be considered to lose track of the correct sequence number because it may lose track of the number records exchanged between session participants.

Thus, in some embodiments, for some protocols the NMC may be disabled from decrypting subsequently captured records because the NMC may not have the correct sequence number.

At block 1006, in one or more of the various embodiments, NMCs may be arranged to capture a next record from the capture flow.

In some embodiments, NMCs may be arranged to determine the beginning of the next capture record based on one or more record header fields that may be unencrypted. However, in some embodiments, NMCs may be unable to determine the number of records that were dropped or missed due to the hole in the capture flow. For example, the first five bytes of a TLS protocol record may be unencrypted while the payload portion of the record may be encrypted.

Accordingly, in some embodiments, after a hole has been encountered, NMCs may capture the next TLS record but the number of missed TLS records on the capture flow may be unknown. Thus, in some embodiments, the sequence number tracked by the NMC may be incorrect such that the NMC may be disabled from decrypting subsequent TLS records provided by the capture flow. Note, if a break or error similar to a hole occurs in the network flow, the participants in the connection session may actively perform corrective actions, such as issuing reset commands, resend requests, or the like. In contrast, NMCs that encounter holes in capture flows may be excluded from performing corrective actions because the NMCs are not participants in the connection/session. Note, if participants in an encryption reset a connection, an NMC may be arranged to observe the reset activity to reestablish decryption of the capture flow.

At block 1008, in one or more of the various embodiments, NMCs may be arranged to determine the size of the hole. In some embodiments, NMCs may be arranged to employ information provided by the transport protocols (e.g., TCP/IP) to compute or estimate the size of the hole. For example, if the transport protocol is TCP/IP, one or more fields, such as TCP sequence numbers, maximum sequence size, IPv4 Total Length, or the like, may be employed to compute or estimate the number of bytes that may be lost to the hole. Note, in some embodiments, NMCs may be arranged to be adaptable to other size determination methods depending on the particular protocols being employed in the monitored network traffic. Accordingly, in some embodiments, NMCs may be arranged to employ rules, instructions, parsers, libraries, or the like, for determining hole sizes that may be provided by configuration information to account for local requirements or local circumstances.

At block 1010, in one or more of the various embodiments, NMCs may be arranged to determine one or more candidate sequence numbers.

In some embodiments, NMCs may be arranged to track the average size of previously captured and decrypted records. Accordingly, in some embodiments, NMCs may be arranged to determine a range of candidate sequence numbers based on one or more metrics such as the average record size, the size of the hole, or the like. For example, given a last known complete record sequence number of 3033, an average record size of 1000 bytes, and a hole size of 2800 bytes, NMCs may be configured to determine a range of candidate sequence number for the next observed record after the hole of one past the last known sequence number, or 3035 through 3040 or beyond depending on the size of the hole and the estimated number of records that may be lost the hole.

As described above, the number of elements in the sequence (range) of candidate sequence numbers may vary depending on how the NMC may be configured. Also, in some embodiments, NMCs may be arranged to dynamically determine the number of elements to include in the range candidate sequence numbers based on one or more other performance metrics or utilization metrics. Likewise, in some embodiments, the number of elements in the range of candidate sequence numbers may be modified or influenced based on the resources participating in the monitored network flows. For example, in some embodiments, if capture flows may be associated with network flows associated with critical or sensitive services or resources, NMCs may be configured to increase the range of candidate sequence numbers to enable more candidate sequence numbers to be available.

At block 1012, in one or more of the various embodiments, NMCs may be arranged to attempt to decrypt the captured record. In some embodiments, NMCs may be arranged to employ the candidate sequence numbers along with other keys or secrets associated with the monitored network flow to attempt to decrypt the records from the capture flow. In some embodiments, NMCs may be arranged to iterate over the range of candidate sequence numbers to attempt decryption of the records from the capture flow. Also, in some embodiments, NMCs may be configured test two or more candidate sequence numbers in parallel rather than testing them serially.

At decision block 1014, in one or more of the various embodiments, if the record may be decrypted successfully, control may be returned to a calling process; otherwise, control may transfer to decision block 1016.

In some embodiments, NMCs may be arranged to determine if the record was decrypted by examining the contents of the decrypted record. In some embodiments, if the content may be read or otherwise may be consistent with previously decrypted records, the NMC may determine that the correct sequence number has been determined enabling resynchronizing of encrypted network traffic. For example, for some embodiments, record protocols may define one or more fields that may be tested to determine if the encryption of the record was successful. For example, a correctly decrypted TLS record payload includes a record-type field at a known position. Accordingly, for example, NMCs may verify the putatively decrypted TLS record has the correct record type value at the expected field/position in the decrypted TLS record. Also, in some cases, protocols may include checksum values, message authentication values, or other validation information that NMCs may be employed to validate that records may be decrypted correctly.

At decision block 1016, in one or more of the various embodiments, if the NMCs may be configured to continue to attempt resynchronization of the capture flows, control may loop back to block 1010; otherwise, control may transfer to block 1018.

As described above, in some embodiments, NMCs may be arranged to continue iterating through candidate record sequence numbers in an attempt to decrypt the captured record. In some embodiments, if the candidate sequence numbers may be exhausted or other conditions may be met, NMCs may terminate the attempt to resynchronize with the capture flow. In some embodiments, other conditions may include encountering unexpected errors, such as corrupt data in the captured record, timeouts, occurrence of higher priority needs, or the like.

In some embodiments, if there may be additional candidate record sequence numbers to try, the NMCs may select the next available candidate record sequence number and try again.

At block 1018, in one or more of the various embodiments, NMCs may be arranged to abandon the attempt to resynchronize with the capture flows.

Accordingly, in some embodiments, if the NMC has exhausted the range of candidate record sequence numbers (or other termination conditions may be met), the NMC may be arranged to abandon the resynchronization attempt for the current capture flow.

Next, in one or more of the various embodiments, control may be returned to a calling process.

Figure 11:
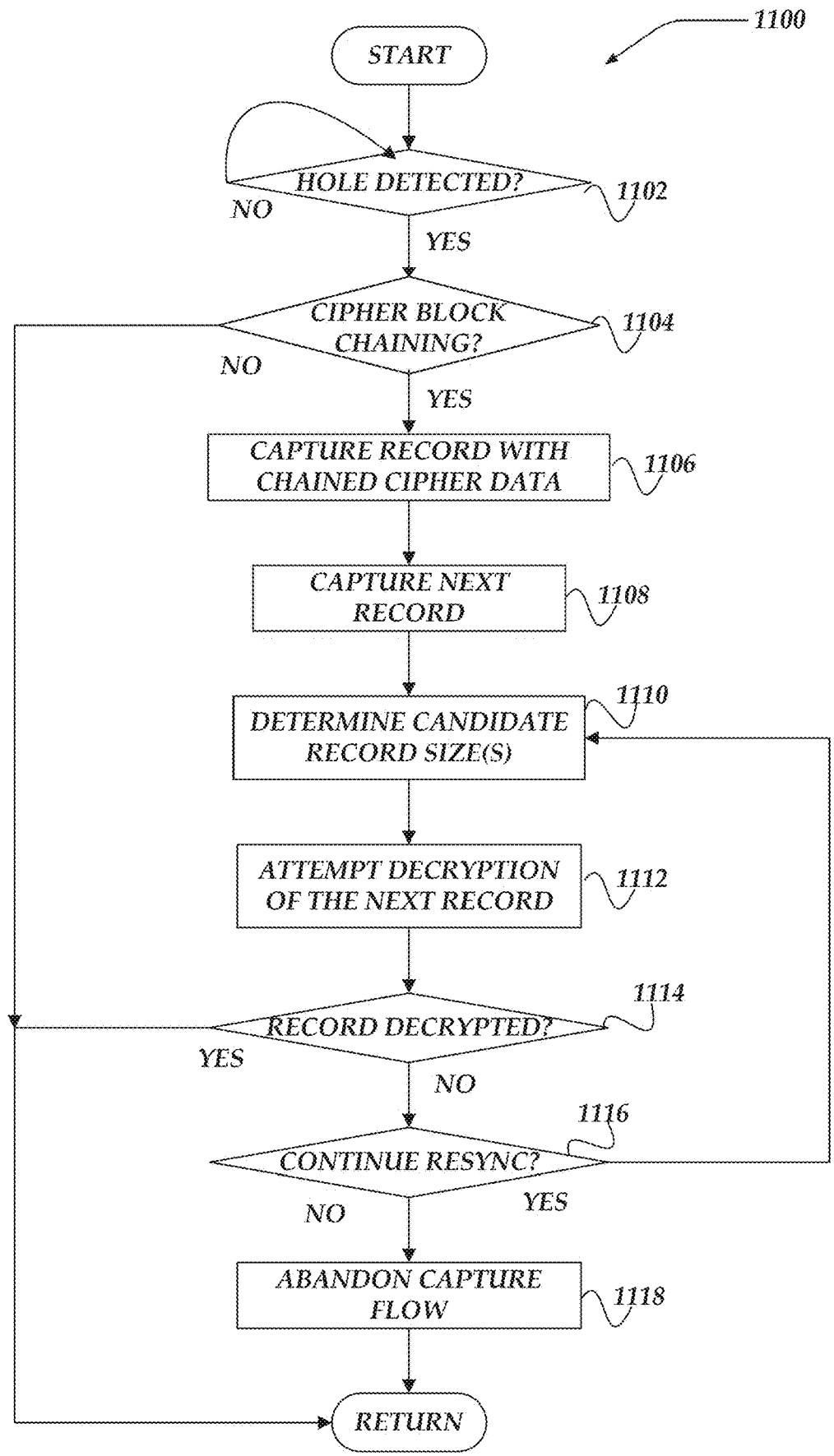
FIG. 11 illustrates a flowchart of a process for resynchronizing encrypted network traffic in accordance with one or more of the various embodiments.

FIG. 11 illustrates a flowchart of process 1100 for resynchronizing encrypted network traffic in accordance with one or more of the various embodiments. After a start block, at decision block 1102, in one or more of the various embodiments, if a hole in a capture flow may be detected, control may transfer to decision block 1104; otherwise, control may loop back to decision block 1102. As described above, NMCs may be arranged to detect holes in capture flows.

At decision block 1104, in one or more of the various embodiments, if the capture flow protocol employs cipher block chaining, or the like, control may transfer to block 1106; otherwise, control may be returned to a calling process.

As described above, cipher block chaining refers to various cryptography methods that employ one or more portions of one or more previously received cipher blocks to decrypt subsequent cipher blocks. In some cases, for some embodiments, records may include one or more cipher blocks for a block cipher.

Note, some cipher-chaining protocols may use fixed size cipher blocks with padding added as necessary to the clear text before encryption. Accordingly, in some embodiments, it may be assumed that NMCs may determine the correct protocol block size before holes are encountered.

At block 1106, in one or more of the various embodiments, NMCs may be arranged to capture a record that includes the chained cipher data. In some embodiments, the chained cipher data may include one or more cipher blocks of a protocol that employs cipher block chaining.

In some embodiments, one or more records may be included in a single network traffic packet. For example, if TCP/IP is used to transport the records, one or more records may be included in a TCP segment. Likewise, in some cases, a record may require more than one TCP segment to transport. Accordingly, in some embodiments, NMCs may identify records separate from the transport protocols.

Thus, in some embodiments, capturing the record that includes the chained cipher data may include waiting for the capture flow to provide one or more transport protocol segments until an entire record may be observed.

At block 1108, in one or more of the various embodiments, NMCs may be arranged to capture the next record after the chained cipher data. As described above, in some embodiments, NMCs may be arranged to determine the next record that occurs after the record with the chained cipher data has been captured.

In some embodiments, capturing the next record may include waiting for the capture flow to provide one or more transport protocol segments until an entire record may be observed.

At block 1110, in one or more of the various embodiments, NMCs may be arranged to determine one or more candidate cipher data size values. As mentioned above, in some embodiments, some record protocols employ data included in previous records to decrypt data in subsequent records. In contrast to the tracking record sequence numbers by counting the number of records exchanged by session participants, data captured in the chained cipher data may be used as part of the encryption process for information included in subsequent records. Accordingly, if cipher block chaining is used, plain text blocks included in the records may be combined (e.g., XORed) with a previously observed cipher text block during encryption. In some embodiments, records may include one or more cipher text blocks.

At block 1112, in one or more of the various embodiments, NMCs may be arranged to attempt decryption of the next record. In some embodiments, NMCs may be arranged to determine a portion of the previously captured records that may be considered a candidate key block.

At decision block 1114, in one or more of the various embodiments, if the record may be decrypted successfully, control may be returned to a calling process; otherwise, control may transfer to decision block 1116.

In some embodiments, NMCs may be arranged to validate decryption by observing expected fields values, such as record types, sequence numbers, message authenticators, check sums, or the like, that may be expected to be included in or correspond to correctly decrypted cipher blocks or records.

Also, as described above, the payload or contents of decrypted records may be forwarded to one or more application protocol parsers for further processing.

At decision block 1116, in one or more of the various embodiments, if the resynchronization effort may continue, control may loop back to block 1108; otherwise, control may transfer to block 1118.

As described above, in some embodiments, NMCs may be arranged to examine various conditions to determine if resynchronization actions should continue. For example, one or more of a fixed number of tries, timeouts, or the like, may determine if the resynchronization effort for the capture flow may be abandoned.

At block 1118, in one or more of the various embodiments, NMCs may be arranged to abandon the capture flow.

Figure 12:
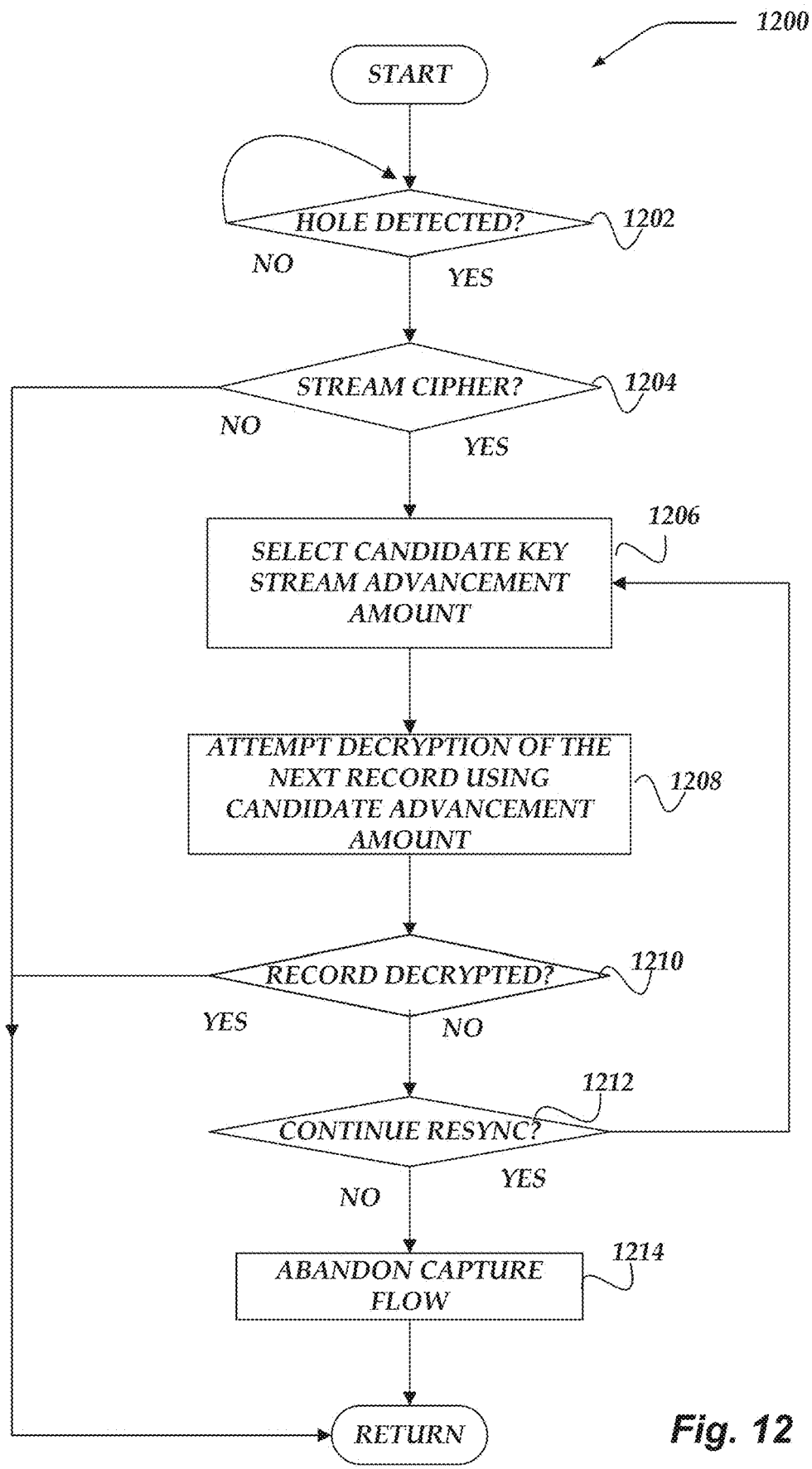
FIG. 12 illustrates a flowchart of a process for resynchronizing encrypted network traffic in accordance with one or more of the various embodiments.

FIG. 12 illustrates a flowchart of process 1200 for resynchronizing encrypted network traffic in accordance with one or more of the various embodiments. After a start block, at decision block 1202, in one or more of the various embodiments, if a hole in a capture flow may be detected, control may transfer to decision block 1204; otherwise, control may loop back to decision block 1202. As described above, NMCs may be arranged to detect holes in capture flows.

At decision block 1204, in one or more of the various embodiments, if the capture flow protocol employs stream cipher, or the like, control may transfer to block 1206; otherwise, control may be returned to a calling process.

As described above, stream ciphers may be considered various cryptography methods that encrypt plaintext by combining plaintext with a key stream to produce cipher data. In some cases, for some embodiments, the records may incorporate cipher data produced by a stream cipher.

At block 1206, in one or more of the various embodiments, NMCs may be arranged to select the candidate key stream advancement amount. In some embodiments, previously received encrypted data may be considered cipher data produced by streaming cipher involving a key stream. In some cases, one or more portions of the cipher data may have been lost to the hole. In some embodiments, NMCs may know the size or length of the missing cipher data such that they know how much to advance the key stream. However, the occurrence of the hole may de-synchronize the cipher data such that the NMC may not know how much to advance the key stream.

At block 1208, in one or more of the various embodiments, NMCs may be arranged to attempt decryption of the next record using the key stream advanced a candidate amount.

At decision block 1210, in one or more of the various embodiments, if the record may be decrypted successfully, control may be returned to a calling process; otherwise, control may transfer to decision block 1212.

In some embodiments, NMCs may be arranged to validate decryption by observing expected fields values, such as record types, sequence numbers, message authenticators, check sums, or the like, that may be expected to be included in or correspond to correctly decrypted cipher data or records.

Also, as described above, the payload or contents of decrypted records may be forwarded to one or more application protocol parsers for further processing.

At decision block 1212, in one or more of the various embodiments, if the resynchronization effort may continue, control may loop back to block 1206; otherwise, control may transfer to block 1218.

As described above, in some embodiments, NMCs may be arranged to examine various conditions to determine if resynchronization actions should continue. For example, one or more of a fixed number of tries, timeouts, or the like, may determine if the resynchronization effort for the capture flow may be abandoned.

At block 1214, in one or more of the various embodiments, NMCs may be arranged to abandon the capture flow. Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Use Case

Figure 13:
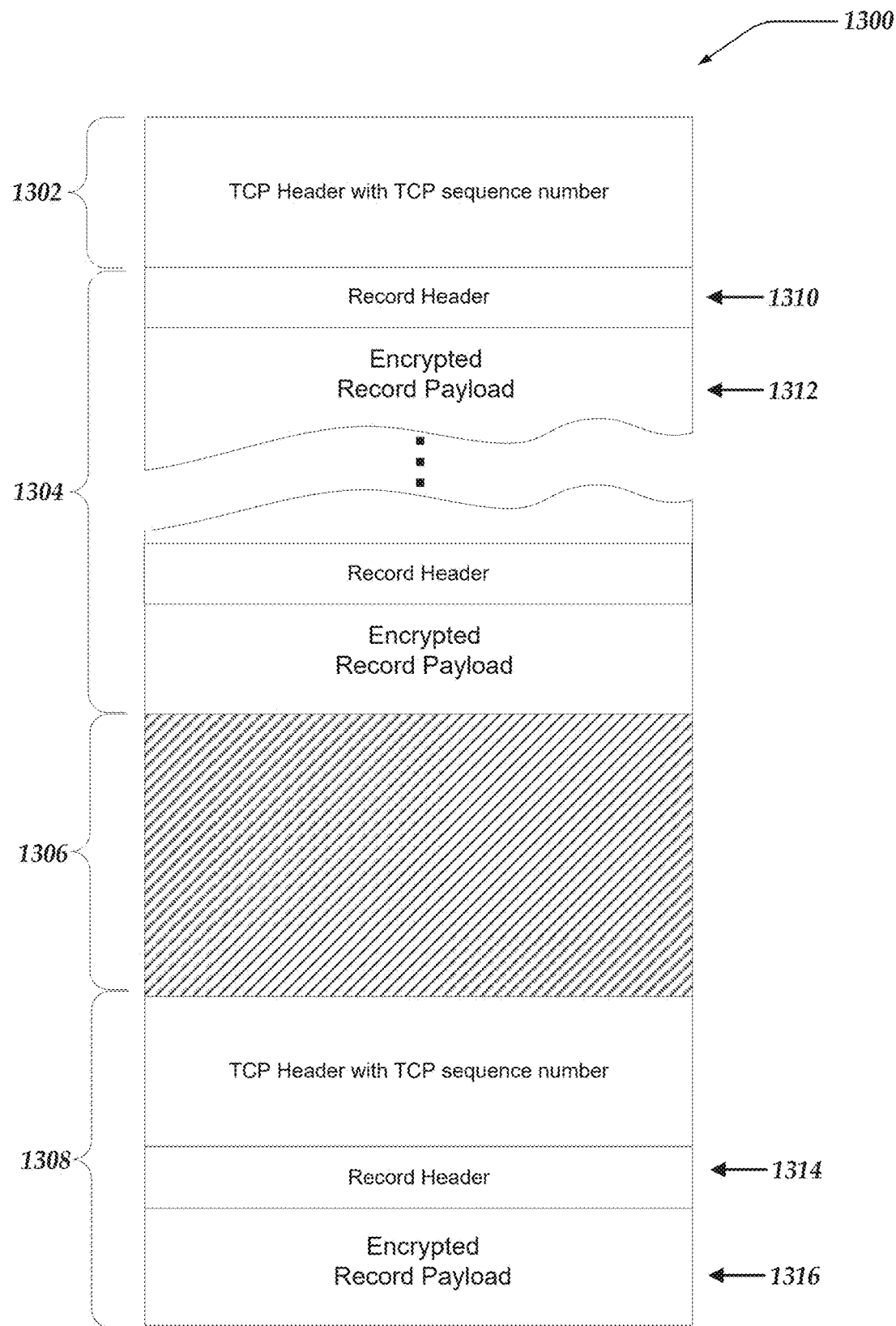
FIG. 13 illustrates a logical schematic of a portion of a capture flow for resynchronizing encrypted network traffic in accordance with one or more of the various embodiments.

FIG. 13 illustrates a logical schematic of a portion of capture flow 1300 for resynchronizing encrypted network traffic in accordance with one or more of the various embodiments.

As described above, in some embodiments, NMCs may be arranged to be provided one or more capture flows that may be associated with one or more network flows in a monitored network. Capture flow 1300 is presented here to provide additional context for the innovations described herein. Note, field widths or section/segment lengths may not be to scale.

In this example, for some embodiments, capture flow 1300 represents a portion of a capture flow as provided to an NMC. Accordingly, in this example: section 1302 represents a TCP header section which includes a TCP sequence number among other fields not shown; section 1304 represents one or more TLS records (or the like) that may be transported using TCP/IP in a TCP segment or packet; section 1306 represents a hole in the capture flow; and section 1308 represents a TCP segment/packet that comes after the hole.

One of ordinary skill in the art will appreciate that TCP headers include various fields, including TCP sequence numbers, offset values, or the like, that NMCs may employ with other information (e.g. IPv4 Total Length field from an enclosing IP header) to compute the size of the payload/Data section of a given TCP segment (e.g., section 1304). One of ordinary skill in the art will appreciate that NMCs may be enabled to compute the size of TCP segments or TCP Data based on non-encrypted information included in IP headers or TCP headers.

In this example, record headers, such as record header 1310, or the like, may be unencrypted. In some embodiments, one or more protocols may provide information in record headers, such as protocol identifiers, protocol version information, or the like. For example, TLS record headers may be non-encrypted enabling protocol parsers to identify or characterize data as TLS records.

In some embodiments, the information or data in records may be included in record payloads, such as record payload 1312, or the like. Accordingly, in some embodiments, some protocols (such as TLS) may employ encrypted record payloads. Thus, absent the required keys or other secrets, record payloads may appear as random values or otherwise considered opaque to observers. In some embodiments, NMCs may be assumed to have access to the keys or other secrets that enable the decryption of the record payloads provided by capture flows.

As described above, some data protocols may require conversation/session participants to keep count of sequence numbers by counting the number of exchanged records. Accordingly, in some embodiments, to enable decryption of such records, NMCs may be arranged to keep a count of the number records exchanged based on observing capture flows. Accordingly, in some embodiments, encountering a hole which may omit data or otherwise disrupt one or more records may cause NMCs to lose track of the correct sequence number, disabling the NMCs from decrypting full records that come after a hole.

For example, in some embodiments, NMCs may be enabled to determine the occurrence of holes, such as hole 1306, upon restoration of the capture flow. Further, in some embodiments, NMCs may be arranged to compute the size of holes based on information included in unencrypted protocol headers, such as IP headers, TCP headers, or the like. For example, in some embodiments, if the last TCP sequence number that was observed before hole 1306 is 45000 and the first TCP sequence number observed after hole 1306 (in TCP header 1308) is 4650045010, the NMC may determine that 1500 TCP payload bytes were lost to hole 1306. Note, in some embodiments, while the hole size is determined, the number of records lost to the hole may remain unknown. Accordingly, in some embodiments, NMCs may employ other metrics, such as average record size (computed based on records that were observed before the hole is encountered) to estimate the number of missed records. For example, if the average record size is 900 bytes and the size of the hole is 9000 bytes, an NMC may estimate that about ten records were lost because of the hole.

Accordingly, in some embodiments, if the number of records may be estimated, NMCs may generate a range of record sequence numbers based on the estimation. For example, if the NMC estimates that nine records were lost and the last record sequence number is 8000, NMCs may be configured to generate a range of candidate record sequence numbers, such as 8005 through 8015. Accordingly, in some embodiments, NMCs may iterate through the candidate record sequence numbers in an attempt to decrypt the next captured encrypted record payload. In some embodiments, NMCs may be enabled to determine if the correct record sequence number has been determined based on being able to read expected values from the putatively decrypted record payload. For example, an encrypted TLS record payload for at least TLS 1.3 should include an inner record type value that should have one or more expected values. Accordingly, in some embodiments, if the position corresponding to the inner record type field in the putatively decrypted record payload includes an invalid record type value, the NMC may infer that the candidate record sequence number used to attempt decryption of the record payload is incorrect. Likewise, in some embodiments, there may be a message authentication code or the like that can be validated as part of performing decryption, which can also be checked to verify that decryption was successful.

Further, as described above, some secure protocols or versions thereof may be configured to use one or more features of previously observed records to decrypt subsequent records. For example, some protocols may require some or all of the last received record to decrypt the next record. Thus, rather than predicting record sequence numbers, NMCs may employ candidate portions of the first record observed after a hole to decrypt the next record to resynchronize with the encrypted network traffic. Accordingly, in some embodiments, rather than generating a range of candidate record sequence numbers, NMCs may generate a range of sizes, offset values, or positions and use those values to select portions from the first complete record captured after the hole to attempt decryption of the next record. For example, if the protocol uses the encrypted record payload of a prior adjacent record payload to decrypt the next record payload, NMCs may generate a range of candidate record payload size values that may determine the number bytes to use for decryption attempts to resynchronize with encrypted network traffic.

Similarly, in some embodiments, if the encrypted protocol may be a stream cipher, NMCs may determine a range of stream cipher advancement amounts based on the encrypted traffic observed after the hole.

Note, in this example, for some embodiments, TCP segment 1308, record header 1314, and record payload 1316 represent traffic received after hole 1306.

Further, one of ordinary skill in the art will appreciate that while TLS protocol may be used in some the examples described herein, the disclosed innovations may be applied to other protocols that have features similar to TLS.

Also, one of ordinary skill in the art will appreciate that monitored network traffic may include one or more layers of different protocols, some non-encrypted or some encrypted. For example, in some embodiments, there may be one or more layers of application protocols carried in a record. Accordingly, while for brevity or clarity the innovations described herein may be described in terms of IP/TCP/TLS protocol layers, one of ordinary skill in the art will appreciate that these innovations may be applied to different protocols or different layers. For example, in some embodiments, encrypted payload records may include another encrypted protocol that wraps another protocol, and so on. Thus, in some embodiments, NMCs may employ these innovations to resynchronize with protocols carried in the encrypted records.

What is claimed as new and desired to be protected by Letters Patent of the United States is:

1. A method for monitoring network traffic in a network using one or more processors that are configured to execute instructions, wherein the execution of the instructions causes performance of actions, comprising:
    monitoring a capture flow that includes network traffic for a plurality of records that are encrypted and captured from one or more network flows, wherein the captured network traffic is decrypted for analysis based on an encryption protocol and one or more previously captured records that were decrypted and identified as a candidate key block;
    determining a hole in the capture flow based on one or more of gaps in one or more portions of the captured network traffic, wherein the hole disables the monitoring of the capture flow and the decryption of the captured network traffic;
    determining a size of the hole based on a size of the or more gaps in the one or more portions of the captured network traffic;
    capturing one or more other portions of the captured network traffic that is encrypted from the capture flow and subsequent to the hole;
    iteratively determining one or more cipher resynchronization parameters that include one or more candidate sequence numbers that are validated for decryption of one or more records subsequent to the one or more gaps for the one or more other portions of the captured network traffic, wherein the determination is based on the size of the hole, one or more other portions of the captured network traffic, a last sequence number for one or more decrypted records prior to the one or more gaps, and the encryption protocol, and
    decrypting the one or more other portions of the captured network traffic based on the one or more cipher resynchronization parameters, wherein the monitoring of the capture flow is re-enabled after the hole.

2. The method of claim 1, wherein determining the one or more cipher resynchronization parameters, further comprises:

determining one or more records included in the captured network traffic based on the encryption protocol;

determining one or more sequence numbers based on the one or more records, wherein the one or more sequence numbers are incremented for each record;

generating one or more candidate sequence numbers based on the size of the hole, the one or more sequence numbers, and an average length of the one or more records; and determining a valid sequence number based on the one or more candidate sequence numbers and the one or more other portions of the captured network traffic, wherein the valid sequence number enables decryption of the one or more other portions of the captured network traffic after the hole.

3. The method of claim 1, wherein determining the one or more cipher resynchronization parameters, further comprises:

determining a cipher block size based on the captured network traffic and the encryption protocol;

determining candidate chained cipher data based on the one or more other portions of the other captured network traffic, the cipher block size and the encryption protocol, wherein the candidate chained cipher data is extracted from the one or more other portions of the other captured network traffic; and validating the candidate chained cipher data based on a verified decryption of the one or more other portions of the captured network traffic, wherein the valid chained cipher data enables decryption of the one or more other portions of the captured network traffic after the hole.

4. The method of claim 1, further comprising:

determining one or more application protocol parsers based on the decrypted captured network traffic, wherein the decrypted captured network traffic is forwarded to the one or more application protocol parsers;

forwarding the decrypted one or more other portions of the captured network traffic to the one or more application protocol parsers; and notifying the one or more application protocol parsers that the hole was determined in the capture flow.

5. The method of claim 1, further comprising:

determining that each of the one or more cipher resynchronization parameters is invalid based on the one or more other portions of the captured network traffic and the encryption protocol; and abandoning the monitoring of the capture flow based on an absence of one or more valid secrets.

6. The method of claim 1, wherein monitoring the capture flow, further comprises:

determining one or more metrics associated with the captured network traffic, including one or more of a record count, an average record size, a record type, a cipher suiter, a cipher mode, a cipher type, or a cipher version; and further determining the one or more cipher resynchronization parameters based on the one or more metrics.

7. The method of claim 1, wherein determining the hole in the capture flow, further comprises:

detecting one or more features in the capture flow, including one or more of an absence of capture flow traffic, an acquisition of a partial record, a missing record field, an incorrect record field, a gap in transport layer sequence numbers, or an extended gap between two or more transport layer packets in the capture flow.

8. The method of claim 1, wherein determining the one or more cipher resynchronization parameters, further comprises:

generating one or more candidate key stream advancement amounts based on the size of the hole, and an average length of the one or more records; and validating the one or more candidate key stream advancement amounts based on a verified decryption of the one or more other portions of the captured network traffic, wherein a valid key stream advancement amount enables decryption of the one or more other portions of the captured network traffic after the hole.

9. A network monitoring computer (NMC) for monitoring network traffic between one or more computers, comprising:

a transceiver that communicates over the network;

a memory that stores at least instructions; and one or more processors that are configured to execute instructions to cause actions, including:

monitoring a capture flow that includes network traffic for a plurality of records that are encrypted and captured from one or more network flows, wherein the captured network traffic is decrypted for analysis based on an encryption protocol and one or more previously captured records that were decrypted and identified as a candidate key block;

determining a hole in the capture flow based on one or more of gaps in one or more portions of the captured network traffic, wherein the hole disables the monitoring of the capture flow and the decryption of the captured network traffic;

determining a size of the hole based on a size of the or more gaps in the one or more portions of the captured network traffic;

capturing one or more other portions of the captured network traffic that is encrypted from the capture flow and subsequent to the hole;

iteratively determining one or more cipher resynchronization parameters that include one or more candidate sequence numbers that are validated for decryption of one or more records subsequent to the one or more gaps for the one or more other portions of the captured network traffic, wherein the determination is based on the size of the hole, one or more other portions of the captured network traffic, a last sequence number for one or more decrypted records prior to the one or more gaps, and the encryption protocol, and decrypting the one or more other portions of the captured network traffic based on the one or more cipher resynchronization parameters, wherein the monitoring of the capture flow is re-enabled after the hole.

10. The NMC of claim 9, wherein determining the one or more cipher resynchronization parameters, further comprises:

determining one or more records included in the captured network traffic based on the encryption protocol;

determining one or more sequence numbers based on the one or more records, wherein the one or more sequence numbers are incremented for each record;

generating one or more candidate sequence numbers based on the size of the hole, the one or more sequence numbers, and an average length of the one or more records; and determining a valid sequence number based on the one or more candidate sequence numbers and the one or more other portions of the captured network traffic, wherein the valid sequence number enables decryption of the one or more other portions of the captured network traffic after the hole.

11. The NMC of claim 9, wherein determining the one or more cipher resynchronization parameters, further comprises:
   determining a cipher block size based on the captured network traffic and the encryption protocol;
   determining candidate chained cipher data based on the one or more other portions of the captured network traffic, the cipher block size and the encryption protocol, wherein the candidate chained cipher data is extracted from the one or more other portions of the captured network traffic; and
   validating the candidate chained cipher data based on a verified decryption of the one or more other portions of the captured network traffic, wherein the valid chained cipher data enables decryption of the one or more other portions of the captured network traffic after the hole.

12. The NMC of claim 9, wherein the one or more processors are configured to execute instructions to cause actions, further comprising:
   determining one or more application protocol parsers based on the decrypted captured network traffic, wherein the decrypted captured network traffic is forwarded to the one or more application protocol parsers;
   forwarding the decrypted one or more other portions of the captured network traffic to the one or more application protocol parsers; and
   notifying the one or more application protocol parsers that the hole was determined in the capture flow.

13. The NMC of claim 9, wherein the one or more processors are configured to execute instructions to cause actions, further comprising:
   determining that each of the one or more cipher resynchronization parameters is invalid based on the one or more other portions of the captured network traffic and the encryption protocol; and
   abandoning the monitoring of the capture flow based on an absence of one or more valid secrets.

14. The NMC of claim 9, wherein monitoring the capture flow, further comprises:
   determining one or more metrics associated with the captured network traffic, including one or more of a record count, an average record size, a record type, a cipher suite, a cipher mode, a cipher type, or a cipher version; and
   further determining the one or more cipher resynchronization parameters based on the one or more metrics.

15. The NMC of claim 9, wherein determining the hole in the capture flow, further comprises:
   detecting one or more features in the capture flow, including one or more of an absence of capture flow traffic, an acquisition of a partial record, a missing record field, an incorrect record field, a gap in transport layer sequence numbers, or an extended gap between two or more transport layer packets in the capture flow.

16. The NMC of claim 9, wherein determining the one or more cipher resynchronization parameters, further comprises:
   generating one or more candidate key stream advancement amounts based on the size of the hole and an average length of the one or more records; and
   validating the one or more candidate key stream advancement amounts based on a verified decryption of the one or more other portions of the captured network traffic, wherein a valid key stream advancement amount enables decryption of the one or more other portions of the captured network traffic after the hole.

17. A system for monitoring network traffic in a network:
   one or more network monitoring computers (NMCs), comprising:
      a memory that stores at least instructions; and
      one or more processors are configured to execute instructions to cause actions including:
         monitoring a capture flow that includes network traffic for a plurality of records that are encrypted and captured from one or more network flows, wherein the captured network traffic is decrypted for analysis based on an encryption protocol and one or more previously captured records that were decrypted and identified as a candidate key block;
         determining a hole in the capture flow based on one or more of gaps in one or more portions of the captured network traffic, wherein the hole disables the monitoring of the capture flow and the decryption of the captured network traffic;
         determining a size of the hole based on a size of the or more gaps in the one or more portions of the captured network traffic;
         capturing one or more other portions of the captured network traffic that is encrypted from the capture flow and subsequent to the hole;
         iteratively determining one or more cipher resynchronization parameters that include one or more candidate sequence numbers that are validated for decryption of one or more records subsequent to the one or more gaps for the one or more other portions of the captured network traffic, wherein the determination is based on the size of the hole, one or more other portions of the captured network traffic, a last sequence number for one or more decrypted records prior to the one or more gaps, and the encryption protocol, and
         decrypting the one or more other portions of the captured network traffic based on the one or more cipher resynchronization parameters, wherein the monitoring of the capture flow is re-enabled after the hole; and
   one or more client computers, comprising:
      a memory that stores at least instructions; and
      one or more processors that are configured to execute instructions to cause actions, including:
         providing one or more portions of the network traffic.

18. The system of claim 17, wherein determining the one or more cipher resynchronization parameters, further comprises:
   determining one or more records included in the captured network traffic based on the encryption protocol;
   determining one or more sequence numbers based on the one or more records, wherein the one or more sequence numbers are incremented for each record;
   generating one or more candidate sequence numbers based on the size of the hole, the one or more sequence numbers, and an average length of the one or more records; and
   determining a valid sequence number based on the one or more candidate sequence numbers and the one or more other portions of the captured network traffic, wherein the valid sequence number enables decryption of the one or more other portions of the captured network traffic after the hole.

19. The system of claim 17, wherein determining the one or more cipher resynchronization parameters, further comprises:
   determining a cipher block size based on the captured network traffic and the encryption protocol;
   determining candidate chained cipher data based on the one or more other portions of the captured network traffic, the cipher block size and the encryption protocol, wherein the candidate chained cipher data is extracted from the one or more other portions of the captured network traffic; and
   validating the candidate chained cipher data based on a verified decryption of the one or more other portions of the captured network traffic, wherein the valid chained cipher data enables decryption of the one or more other portions of the captured network traffic after the hole.

20. A processor readable non-transitory storage media that includes instructions for monitoring network traffic using one or more network monitoring computers, wherein execution of the instructions by the one or more networking monitoring computers perform the method comprising:
   monitoring a capture flow that includes network traffic for a plurality of records that are encrypted and captured from one or more network flows, wherein the captured network traffic is decrypted for analysis based on an encryption protocol and one or more previously captured records that were decrypted and identified as a candidate key block;
   determining a hole in the capture flow based on one or more of gaps in one or more portions of the captured network traffic, wherein the hole disables the monitoring of the capture flow and the decryption of the captured network traffic;
   determining a size of the hole based on a size of the or more gaps in the one or more portions of the captured network traffic;
   capturing one or more other portions of the captured network traffic that is encrypted from the capture flow and subsequent to the hole;
   iteratively determining one or more cipher resynchronization parameters that include one or more candidate sequence numbers that are validated for decryption of one or more records subsequent to the one or more gaps for the one or more other portions of the captured network traffic, wherein the determination is based on the size of the hole, one or more other portions of the captured network traffic, a last sequence number for one or more decrypted records prior to the one or more gaps, and the encryption protocol, and
   decrypting the one or more other portions of the captured network traffic based on the one or more cipher resynchronization parameters, wherein the monitoring of the capture flow is re-enabled after the hole.

* * * * *